United States Patent
Takano

(10) Patent No.: US 11,356,860 B2
(45) Date of Patent: Jun. 7, 2022

(54) COMMUNICATION DEVICE, COMMUNICATION METHOD, AND PROGRAM FOR MEASURING CROSSLINK INTERFERENCE BETWEEN DEVICES

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 136 days.

(21) Appl. No.: 16/760,464

(22) PCT Filed: Sep. 28, 2018

(86) PCT No.: PCT/JP2018/036577
§ 371 (c)(1),
(2) Date: Apr. 30, 2020

(87) PCT Pub. No.: WO2019/093014
PCT Pub. Date: May 16, 2019

(65) Prior Publication Data
US 2020/0344614 A1   Oct. 29, 2020

(30) Foreign Application Priority Data

Nov. 10, 2017 (JP) .............................. JP2017-216969

(51) Int. Cl.
*H04W 4/00* (2018.01)
*H04W 16/28* (2009.01)
(Continued)

(52) U.S. Cl.
CPC ............ *H04W 16/28* (2013.01); *H04B 1/713* (2013.01); *H04B 17/336* (2015.01); *H04W 24/10* (2013.01)

(58) Field of Classification Search
CPC .................................................... H04W 16/28
See application file for complete search history.

(56) References Cited

U.S. PATENT DOCUMENTS

| 10,455,608 | B2 * | 10/2019 | Shepard | H04W 48/00 |
| 10,785,009 | B2 * | 9/2020 | Zhang | H04W 72/082 |
| 11,012,879 | B2 * | 5/2021 | Pao | H04L 5/1469 |
| 11,129,155 | B2 * | 9/2021 | Zhang | H04L 5/0007 |

(Continued)

OTHER PUBLICATIONS

International Search Report and Written Opinion dated Dec. 4, 2018 for PCT/JP2018/036577 filed on Sep. 28, 2018, 9 pages including English Translation of the International Search Report.

(Continued)

*Primary Examiner* — Guang W Li
(74) *Attorney, Agent, or Firm* — Xsensus LLP

(57) ABSTRACT

[Problem] To enable measurement of interference between a downlink signal and an uplink signal transmitted in different cells in a more suitable manner.
[Solution] A communication device includes a communication unit that performs wireless communication with a first terminal device located within a communication range, an acquisition unit that acquires, from another base station, first information related to a second terminal device located within a communication range of the other base station, and a notification unit that notifies the first terminal device of second information for measuring interference of an uplink signal transmitted from the second terminal device to the other base station with a downlink signal transmitted to the first terminal device, based on the acquired first information.

17 Claims, 19 Drawing Sheets

(51) Int. Cl.
*H04B 17/336* (2015.01)
*H04B 1/713* (2011.01)
*H04W 24/10* (2009.01)

(56) References Cited

U.S. PATENT DOCUMENTS

| | | | | |
|---|---|---|---|---|
| 11,178,670 | B2* | 11/2021 | Estevez | H04W 72/046 |
| 2018/0139712 | A1* | 5/2018 | Abedini | H04L 27/26136 |
| 2019/0116564 | A1* | 4/2019 | Åström | H04L 27/2636 |
| 2019/0174436 | A1* | 6/2019 | da Silva | H04L 5/0023 |
| 2019/0191397 | A1* | 6/2019 | Pan | H04W 56/00 |
| 2020/0053661 | A1* | 2/2020 | Yang | H04W 52/383 |
| 2020/0067612 | A1* | 2/2020 | Wu | H04W 24/10 |
| 2020/0106488 | A1* | 4/2020 | Akoum | H04B 17/102 |
| 2020/0112420 | A1* | 4/2020 | Xu | H04W 24/10 |
| 2020/0120531 | A1* | 4/2020 | Qin | H04W 72/046 |
| 2020/0177291 | A1* | 6/2020 | Fei | H04W 24/10 |
| 2020/0367120 | A1* | 11/2020 | Ma | H04W 36/0058 |
| 2020/0389805 | A1* | 12/2020 | Kim | H04W 72/042 |
| 2021/0160891 | A1* | 5/2021 | Yasukawa | H04L 5/0048 |
| 2021/0250797 | A1* | 8/2021 | Karjalainen | H04B 17/336 |
| 2021/0274511 | A1* | 9/2021 | Cao | H04W 72/082 |
| 2021/0360585 | A1* | 11/2021 | Abedini | H04W 72/005 |

OTHER PUBLICATIONS

Renesas Mobile Europe Ltd., "Discussions on interference mitigation schemes for TDD UL-DL reconfiguration", 3GPP TSG RAN WG1 Meeting #72, R1-130419, St Julian's, Malta, Jan. 28-Feb. 1, 2013, 6 pages.

ZTE, "Channel sensing based scheme for CLI mitigation in NR", 3GPP TSG RAN WG1 Meeting #89, R1-1707205, Hangzhou, P.R.China, May 15-19, 2017, pp. 1-9.

Mitsubishi Electric, "Views on SRS designs", 3GPP TSG RAN WG1 Meeting Ad hoc, R1-1710409, Qingdao, P. R. China, Jun. 27-30, 2017, 9 pages.

LG Electronics, "Discussion on beam measurement and reporting", 3GPP TSG RAN WG1 Meeting #90, R1-1713148, Prague, Czech Republic, Aug. 21-25, 2017, 4 pages.

Intel Corporation, "On CLI measurement for NR dynamic TDD", 3GPP TSG RAN WG1 Meeting NR AH 1709, R1-1716333, Nagoya, Japan, Sep. 18-21, 2017, pp. 1-6.

Media Tek Inc., "Corss-link interference management", 3GPP TSG RAN WG1 Meeting NR#3, R1-1716217, Nagoya, Japan, Sep. 18-21, 2017, pp. 1-6.

* cited by examiner

FIG.4
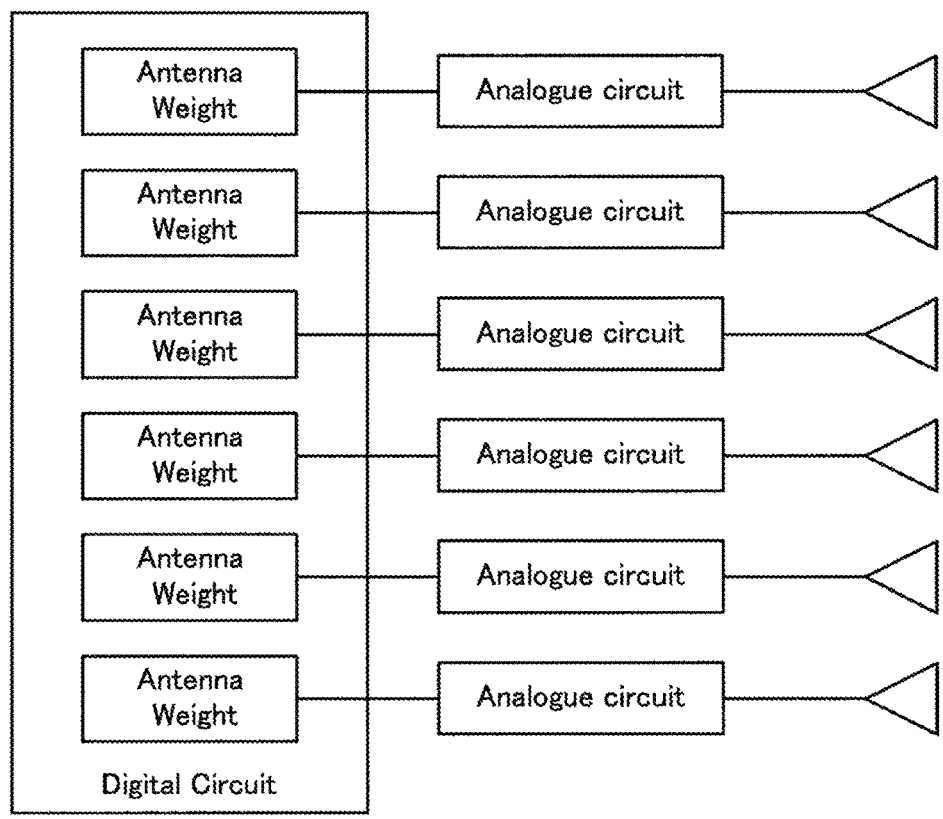
FIG.5
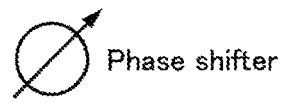
Phase shifter
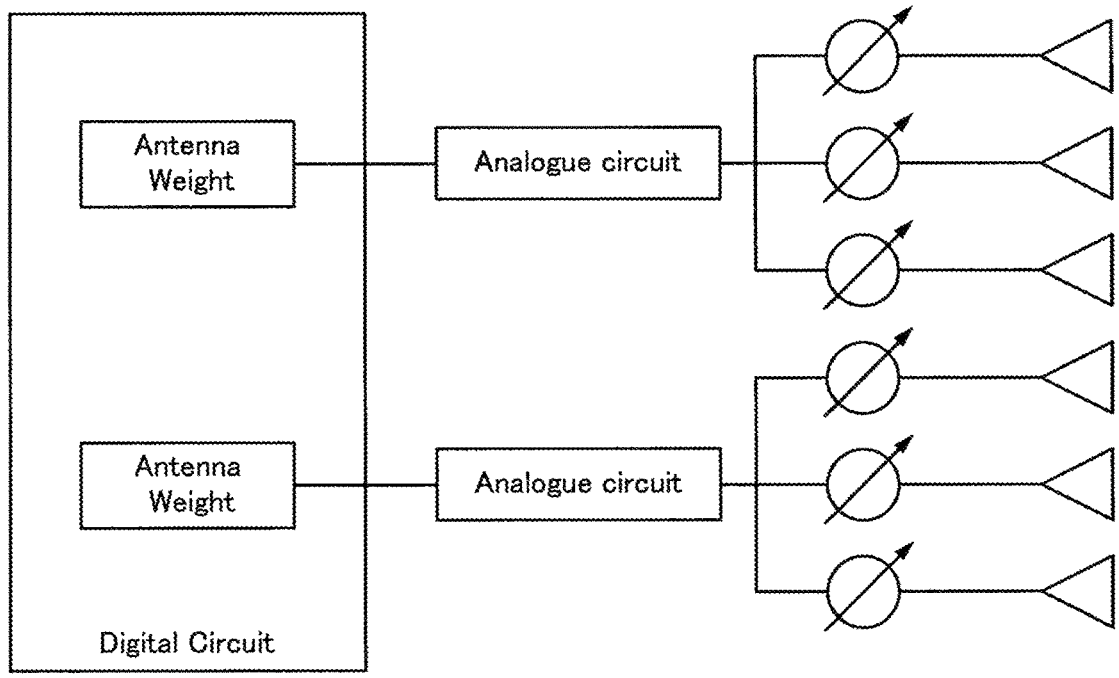

FIG.13

| Configuration | #0 | #1 | #2 | #3 | #4 | #5 | #6 | #7 | #8 | #9 | |
|---|---|---|---|---|---|---|---|---|---|---|---|
| Configuration 0 | D | S | U | U | U | D | S | U | U | U | Downlink=2, Uplink=6 |
| Configuration 6 | D | S | U | U | U | D | S | U | U | D | Downlink=3, Uplink=5 |
| Configuration 1 | D | S | U | U | D | D | S | U | U | D | Downlink=4, Uplink=4 |
| Configuration 3 | D | S | U | U | U | D | D | D | D | D | Downlink=6, Uplink=3 |
| Configuration 2 | D | S | U | D | D | D | S | U | D | D | Downlink=6, Uplink=2 |
| Configuration 4 | D | S | U | U | D | D | D | D | D | D | Downlink=7, Uplink=2 |
| Configuration 5 | D | S | U | D | D | D | D | D | D | D | Downlink=8, Uplink=1 |

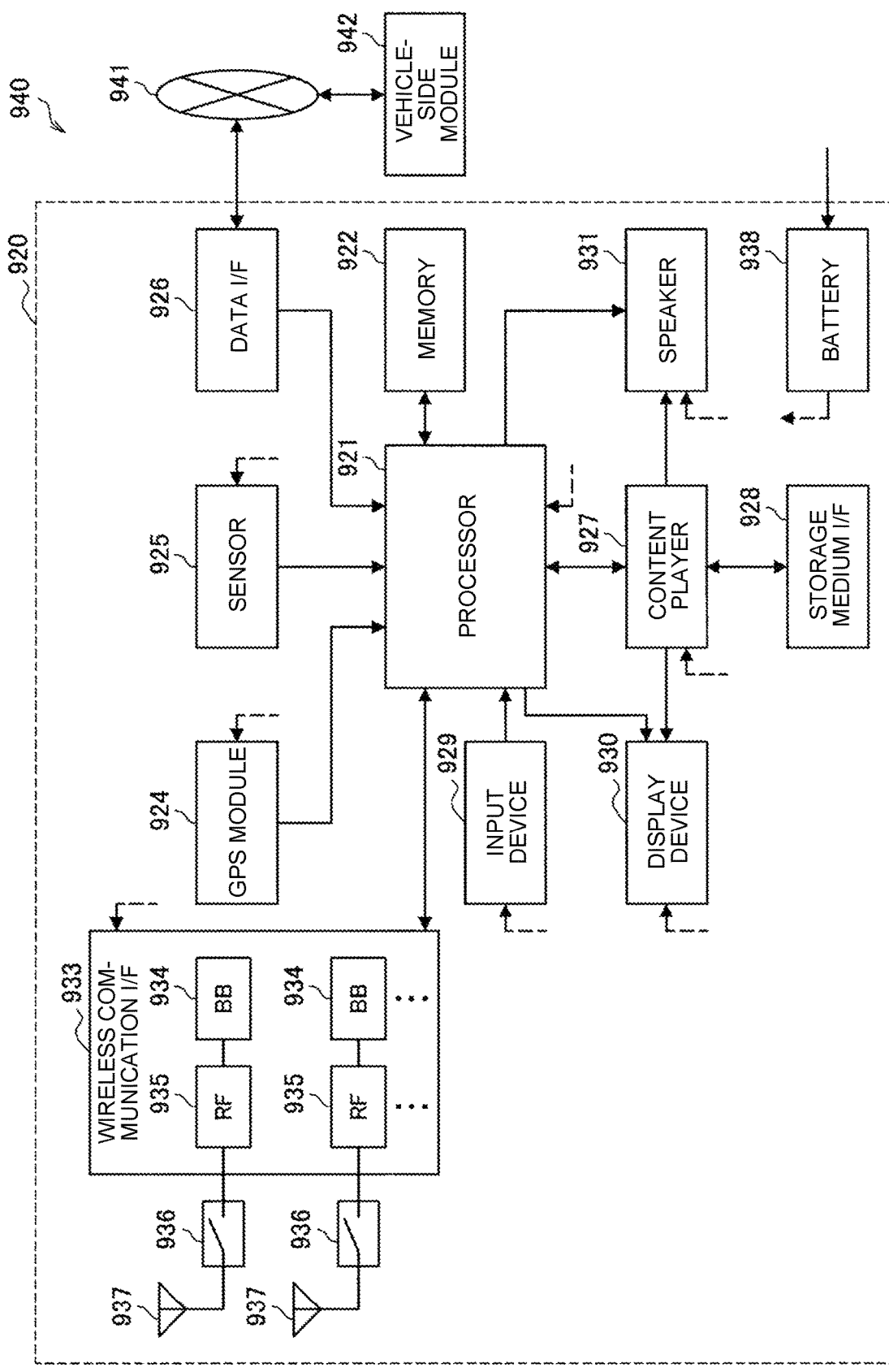

COMMUNICATION DEVICE, COMMUNICATION METHOD, AND PROGRAM FOR MEASURING CROSSLINK INTERFERENCE BETWEEN DEVICES

CROSS-REFERENCE TO RELATED APPLICATIONS

The present application is based on PCT filing PCT/JP2018/036577, filed Sep. 28, 2018, which claims priority to JP 2017-216969, filed Nov. 10, 2017, the entire contents of each are incorporated herein by reference.

FIELD

The present disclosure relates to a communication device, a communication method, and a program.

BACKGROUND

Wireless access schemes and wireless networks (hereinafter, referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)" or "Further EUTRA (FEUTRA)") of cellular mobile communication have been studied in the third generation partnership project (3GPP). In the following description, the LTE includes LTE-A, LTE-A Pro, and EUTRA, and the NR includes NRAT and FEUTRA. In the LTE and the NR, a base station device (base station) is also called an evolved NodeB (eNodeB), and a terminal device (mobile station, mobile station device, and terminal) is also called user equipment (UE). The LTE and the NR are cellular communication systems in which a plurality of areas covered by a base station device are arranged in a cell shape. A single base station device may manage a plurality of cells.

In the fifth generation (5G) mobile communication system following the LTE/LTE-A, a technology using a directional beam for communication between a base station and a terminal device is being studied. By using the technology, it becomes possible to spatially multiplex communication between the base station and the terminal device in addition to multiplexing in time and frequency. For example, Non Patent Literature 1 discloses an example of a technology using a directional beam for communication between a base station and a terminal device.

CITATION LIST

Non Patent Literature

Non Patent Literature 1: LG Electronics, "Discussion on beam measurement and reporting" R1-1713148, 3GPP TSG RAN WG1 Meeting #90, Prague, Czech Republic, 21-25 Aug. 2017

SUMMARY

Technical Problem

However, in NR, in a situation where time division duplex (TDD) is used as a communication scheme, a case where base stations in cells (for example, adjacent cells) located close to each other operate based on different configurations (TDD configuration) may be assumed. In such a case, for example, a situation in which an uplink (UL) signal transmitted from a terminal device in one cell interferes with other terminal devices receiving a downlink (DL) signal in other cells may be assumed. In particular, in a situation where the communication between the base station and the terminal device is spatially multiplexed by using a directional beam, a plurality of base stations are installed to be closer to each other, so the interference described above may be highly like to occur. Therefore, a mechanism for efficiently measuring interference between a downlink signal and an uplink signal transmitted in different cells is required.

Therefore, the present disclosure proposes a technology that enables measurement of interference between a downlink signal and an uplink signal transmitted in different cells in a more suitable manner.

Solution to Problem

According to the present disclosure, a communication device is provided that includes: a communication unit that performs wireless communication with a first terminal device located within a communication range; an acquisition unit that acquires, from another base station, first information related to a second terminal device located within a communication range of the other base station; and a notification unit that notifies the first terminal device of second information for measuring interference of an uplink signal transmitted from the second terminal device to the other base station with a downlink signal transmitted to the first terminal device, based on the acquired first information.

Moreover, according to the present disclosure, a communication device, comprising: a communication unit that performs wireless communication with a first base station; an acquisition unit that acquires, from the first base station, second information on another terminal device located within a communication range of a second base station different from the first base station; and a notification unit that notifies the first base station of third information on interference of an uplink signal transmitted from the other terminal device to the second base station with a downlink signal transmitted from the first base station, the interference being measured based on the second information.

Moreover, according to the present disclosure, a communication method is provided that allows a computer to execute the following steps: performing wireless communication with a first terminal device located within a communication range; acquiring, from another base station, first information related to a second terminal device located within a communication range of the other base station; and notifying the first terminal device of second information for measuring interference of an uplink signal transmitted from the second terminal device to the other base station with a downlink signal transmitted to the first terminal device, based on the acquired first information.

Moreover, according to the present disclosure, a communication method is provided that allows a computer to execute the following steps: performing wireless communication with a first base station; acquiring, from the first base station, second information on another terminal device located within a communication range of a second base station different from the first base station; and notifying the first base station of third information on interference of an uplink signal transmitted from the other terminal device to the second base station with a downlink signal transmitted from the first base station, the interference being measured based on the second information.

Moreover, according to the present disclosure, a program is provided that allows a computer to execute the following operations: performing wireless communication with a first terminal device located within a communication range; acquiring, from another base station, first information related to a second terminal device located within a communication range of the other base station; and notifying the first terminal device of second information for measuring interference of an uplink signal transmitted from the second terminal device to the other base station with a downlink signal transmitted to the first terminal device, based on the acquired first information.

Moreover, according to the present disclosure, a program is provided that allows a computer to execute the following operations: performing wireless communication with a first base station; acquiring, from the first base station, second information on another terminal device located within a communication range of a second base station different from the first base station; and notifying the first base station of third information on interference of an uplink signal transmitted from the other terminal device to the second base station with a downlink signal transmitted from the first base station, the interference being measured based on the second information.

Advantageous Effects of Invention

According to the present disclosure as described above, a technology that enables measurement of interference between a downlink signal and an uplink signal transmitted in different cells in a more suitable manner is provided.

It is noted that the above effects are not necessarily limited, and, along with or instead of the above effects, any of the effects described in the present specification or other effects which can be understood from the present specification may be exhibited.

BRIEF DESCRIPTION OF DRAWINGS

FIG. 4 is an example of a base station in a case where all weights of antennas are configured by a digital circuit in beamforming.

FIG. 5 is an example of a base station in case of including a phase shifter of an analogue circuit in the beamforming.

FIG. 13 is an explanatory diagram for describing an example of TDD configuration.

FIG. 23 is a block diagram illustrating an example of a schematic configuration of a car navigation device.

DESCRIPTION OF EMBODIMENTS

Figure 1:
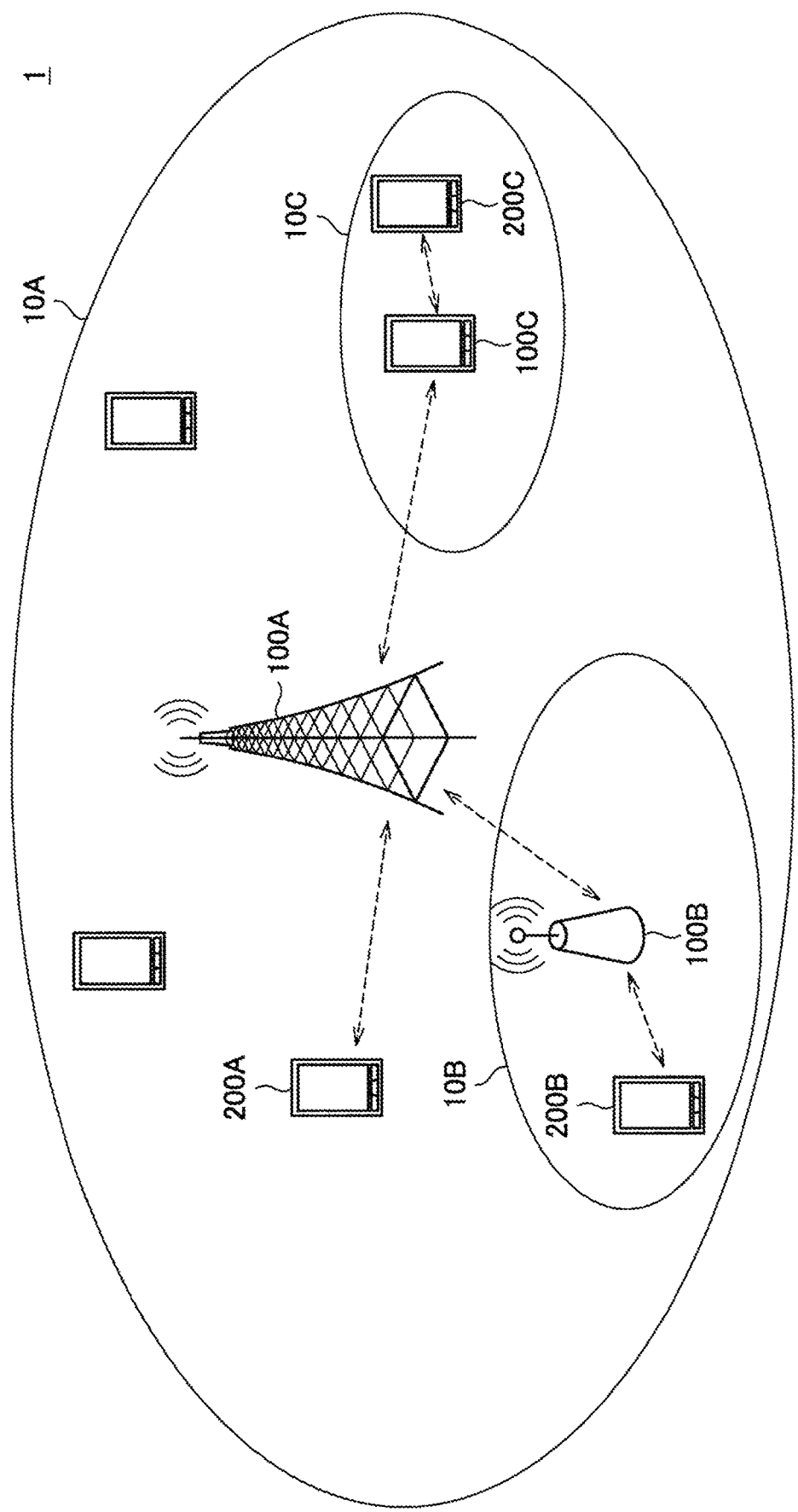
FIG. 1 is an explanatory diagram for describing an example of a schematic configuration of a system according to an embodiment of the present disclosure.

Hereinafter, preferred embodiments of the present disclosure will be described in detail with reference to the accompanying drawings. Note that in the present specification and drawings, components having substantially the same functional configuration will be denoted by the same reference numerals and a redundant description thereof will be omitted.

Note that descriptions will be made in the following order.
1. Configuration example
1.1. Example of system configuration
1.2. Configuration example of base station
1.3. Configuration example of terminal device
2. Details
3. Technical features
4. Application example
4.1. Application example for base station
4.2. Application example for terminal device
5. Conclusion 1. Configuration Example 1.1. Example of System Configuration First, an example of a schematic configuration of a system 1 according to an embodiment of the present disclosure will be described with reference to FIG. 1. FIG. 1 is an explanatory diagram for describing an example of a schematic configuration of a system 1 according to an embodiment of the present disclosure. As illustrated in FIG. 1, the system 1 includes a wireless communication device 100 and a terminal device 200. Here, the terminal device 200 is also called a user. The user may also be called UE. A wireless communication device 100C is also called UE-Relay. Here, the UE may be UE defined in LTE or LTE-A, and the UE-Relay may be a Prose UE to network relay discussed in 3GPP, and more generally, may mean communication equipment.

(1) Wireless Communication Device 100

The wireless communication device 100 is a device that provides a wireless communication service to a subordinate device. For example, a wireless communication device 100A is a base station of a cellular system (or a mobile communication system). The base station 100A performs wireless communication with a device (for example, terminal device 200A) located inside a cell 10A of the base station 100A. For example, the base station 100A transmits a downlink signal to the terminal device 200A and receives an uplink signal from the terminal device 200A.

The base station 100A is logically connected to other base stations by, for example, an X2 interface, and can transmit and receive control information and the like. In addition, the base station 100A is logically connected to a so-called core network (not illustrated) by, for example, an S1 interface, and can transmit and receive the control information and the like. Note that the communication between these devices can be physically relayed by various devices.

Here, the wireless communication device 100A illustrated in FIG. 1 is a macrocell base station, and the cell 10A is a macrocell. On the other hand, wireless communication devices 100B and 100C are master devices that operate small cells 10B and 10C, respectively. As an example, the master device 100B is a small cell base station that is fixedly installed. The small cell base station 100B establishes a wireless backhaul link with the macro cell base station 100A, and establishes an access link with one or more terminal devices (for example, terminal device 200B), respectively, in the small cell 10B. Note that the wireless communication device 100B may be a relay node defined by 3GPP. The master device 100C is a dynamic AP (access point). The dynamic AP 100C is a mobile device that dynamically operates the small cell 10C. The dynamic AP 100C establishes a wireless backhaul link with the macro cell base station 100A, and establishes an access link with one or more terminal devices (for example, terminal device 200C), respectively, in the small cell 10C. The dynamic AP 100C may be, for example, a terminal device equipped with hardware or software operable as a base station or a wireless access point. In this case, the small cell 10C is a dynamically formed localized network (localized network/virtual cell).

The cell 10A may be operated according to any wireless communication scheme such as LTE, LTE-Advanced (LTE-A), LTE-Advanced PRO, GSM (registered trademark), UMTS, W-CDMA, CDMA2000, WiMAX, WiMAX2, or IEEE802.16.

Note that a small cell is a concept that can include various types of cells (for example, femtocells, nanocells, picocells, microcells, and the like) that are arranged to overlap or do not overlap with a macrocell and are smaller than the macrocell. In one example, the small cell is operated by a dedicated base station. In another example, the small cell is operated by allowing a terminal serving as a master device to temporarily operate as a small cell base station. A so-called relay node can also be considered as a form of the small cell base station. A wireless communication device functioning as a master station of the relay node is also called a donor base station. The donor base station may mean DeNB in LTE, or may more generally mean the master station of the relay node.

(2) Terminal Device 200

The terminal device 200 can communicate in a cellular system (or a mobile communication system). The terminal device 200 performs wireless communication with the wireless communication device (for example, base station 100A, and master device 100B or 100C) of the cellular system. For example, the terminal device 200A receives a downlink signal from the base station 100A and transmits an uplink signal to the base station 100A.

In addition, as the terminal device 200, a so-called UE only is not adopted, but a so-called low cost UE such as an MTC terminal, an Enhanced MTC (eMTC) terminal, and an NB-IoT terminal may be adopted.

(3) Supplement

Hereinabove, the schematic configuration of the system 1 has been described above, but the present technology is not limited to the example illustrated in FIG. 1. For example, as a configuration of the system 1, a configuration not including the master device, small cell enhancement (SCE), a heterogeneous network (HetNet), an MTC network, or the like can be adopted. In addition, as another example of the configuration of the system 1, the master device may be connected to the small cell, and the cell may be constructed under the small cell.

1.2. Configuration Example of Base Station

Figure 2:
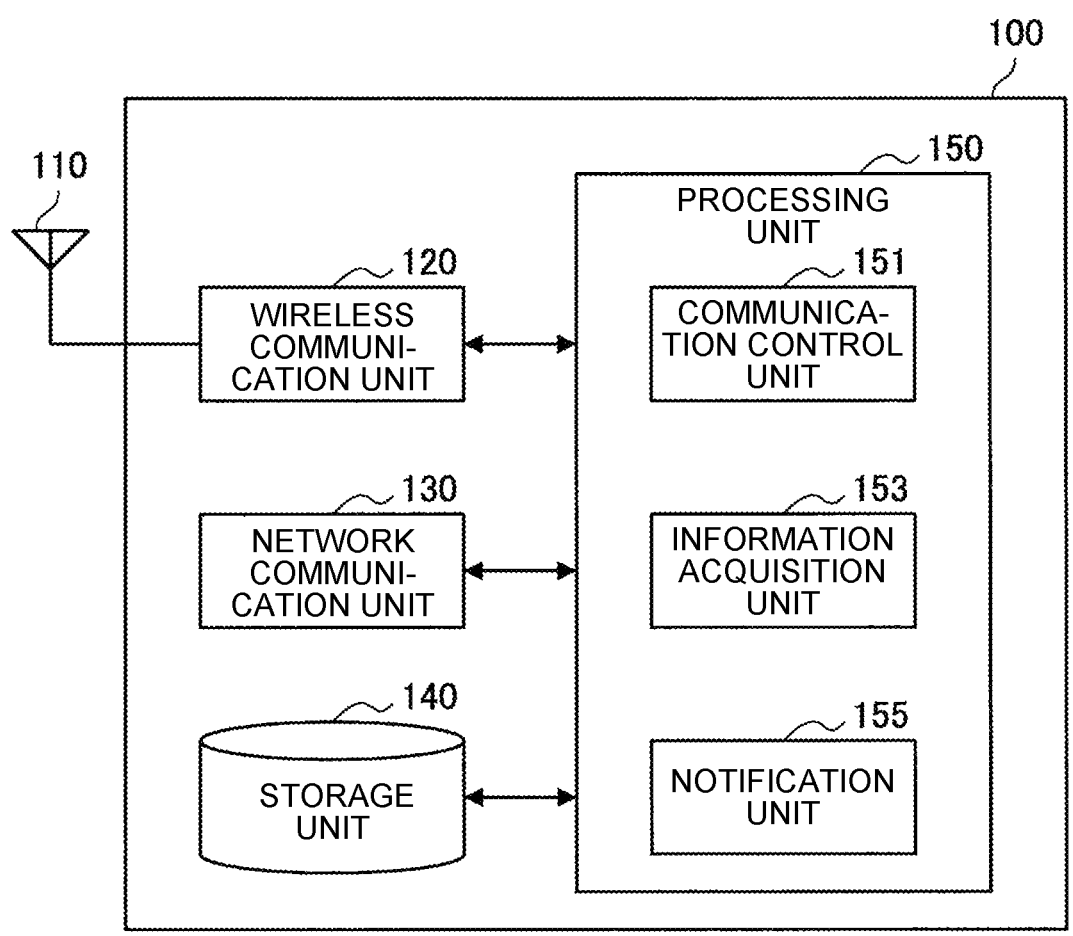
FIG. 2 is a block diagram illustrating an example of a configuration of a base station according to the present embodiment.

Next, the configuration of the base station 100 according to an embodiment of the present disclosure will be described with reference to FIG. 2. FIG. 2 is a block diagram illustrating an example of the configuration of the base station 100 according to an embodiment of the present disclosure. Referring to FIG. 2, the base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 to space as a radio wave. Further, the antenna unit 110 converts the radio wave in the space into a signal and outputs the signal to the wireless communication unit 120.

(2) Wireless Communication Unit 120

The wireless communication unit 120 transmits and receives a signal. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to other nodes and receives information from other nodes. For example, the other nodes include other base stations and core network nodes.

As described above, in the system 1 according to the present embodiment, the terminal device may operate as a relay terminal and may relay communication between a remote terminal and the base station. In such a case, for example, the wireless communication device 100C corresponding to the relay terminal may not include the network communication unit 130.

(4) Storage Unit 140

The storage unit 140 temporarily or permanently stores a program and various data for the operation of the base station 100.

(5) Processing Unit 150

The processing unit 150 provides various functions of the base station 100. The processing unit 150 includes a communication control unit 151, an information acquisition unit 153, and a notification unit 155. Note that the processing unit 150 may further include other components other than these components. That is, the processing unit 150 can perform operations other than the operations of these components.

Operations of the communication control unit 151, the information acquisition unit 153, and the notification unit 155 will be described later in detail.

1.3. Configuration Example of Terminal Device

Figure 3:
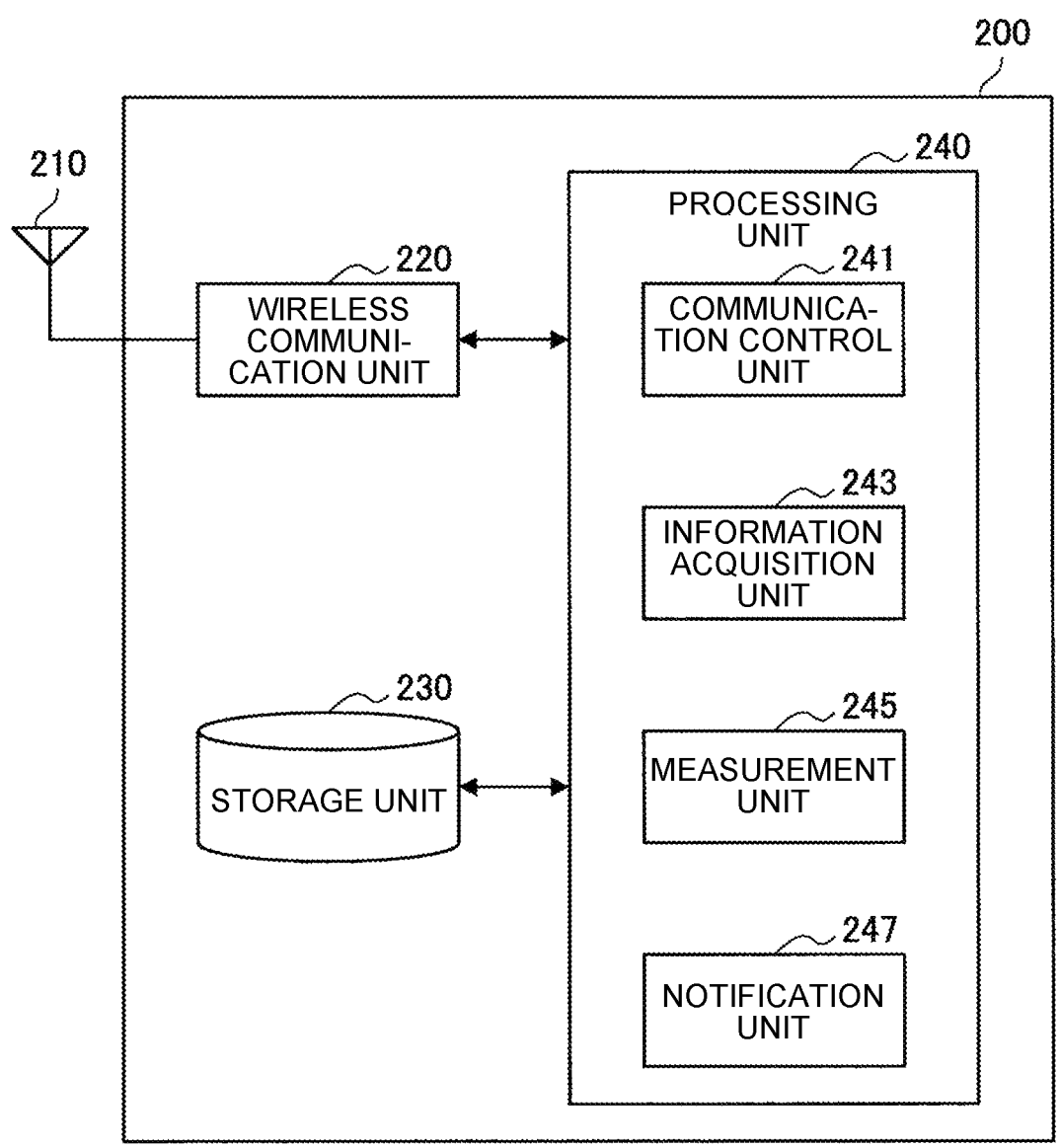
FIG. 3 is a block diagram illustrating an example of a configuration of a terminal device according to the present embodiment.

Next, an example of the configuration of the terminal device 200 according to an embodiment of the present disclosure will be described with reference to FIG. 3. FIG. 3 is a block diagram illustrating an example of the configuration of the terminal device 200 according to the embodiment of the present disclosure. As illustrated in FIG. 3, the terminal device 200 includes an antenna unit 210, a wireless communication unit 220, a storage unit 230, and a processing unit 240.

(1) Antenna Unit 210

The antenna unit 210 radiates a signal output from the wireless communication unit 220 to space as a radio wave. Further, the antenna unit 210 converts the radio wave in the space into a signal and outputs the signal to the wireless communication unit 220.

(2) Wireless Communication Unit 220

The wireless communication unit 220 transmits and receives a signal. For example, the wireless communication unit 220 receives a downlink signal from the base station and transmits an uplink signal to the base station.

In addition, as described above, in the system 1 according to the present embodiment, the terminal device may operate as a relay terminal and may relay communication between a remote terminal and the base station. In such a case, for example, the wireless communication unit 220 in the terminal device 200C operating as a remote terminal may transmit and receive a side link signal to and from a relay terminal.

(3) Storage Unit 230

The storage unit 230 temporarily or permanently stores a program and various data for the operation of the terminal device 200.

(4) Processing Unit 240

The processing unit 240 provides various functions of the terminal device 200. For example, the processing unit 240 includes a communication control unit 241, an information acquisition unit 243, a measurement unit 245, and a notification unit 247. Note that the processing unit 240 may further include other components other than these components. That is, the processing unit 240 can perform operations other than the operations of these components.

Operations of the communication control unit 241, the information acquisition unit 243, the measurement unit 245 and the notification unit 247 will be described later in detail.

2. Details

Subsequently, in describing the embodiment of the present disclosure in detail, first, details leading to the embodiment of the present disclosure will be described.

(Codebook Based Beam)

Future wireless communication systems (5G), which are being studied in 3GPP, are unlikely to be a structure that changes beams radiated from the base station steplessly and regenerates a beam following the terminal device. This is because there is a calculation cost for regenerating a new beam. 3GPP Rel13's FD-MIMO also adopts a method for generating beams in all directions from the base station in advance, and for selecting and providing beams necessary for the terminal device from the beams generated in advance. Such a beam is called codebook based beamforming. If beams are prepared in increments of 1° at an angle of 360° in a horizontal direction, 360 types of beams are required. When the beams overlap each other by half, if 720 beams, which are twice the 360 beams, are prepared, these 720 beams are sufficient as a horizontal codebook based beam. Furthermore, when beams are prepared in increments of 1° increment of 180° in the vertical direction so that the beams overlap each other by half, the horizontal direction is set to 0°, 360 beams can be prepared for 180° from −90° to +90°.

(Necessity of Beam Association)

The base station can be equipped with a very large number of antenna elements, such as 256 (frequency band is 30 GHz) and 1,000 (frequency band is 70 GHz) antenna elements. Thus, as the number of antenna elements increases, it becomes possible to generate a very sharp beam when performing beamforming processing using the antenna. For example, it becomes possible to provide a very sharp beam with a half bandwidth (indicating how often a level at which a gain drops by 3 dB occurs) of 1° or less from the base station to the terminal device.

In order to communicate between the base station and the terminal device, it is necessary to determine which beam the base station uses. In the case of the downlink (DL) communication, it is necessary to determine a DL beam provided from the base station. In addition, in the case of uplink (UL) communication, it is necessary for the base station to determine a UL beam to be used for reception. The latter UL beam means that instead of the base station transmitting the radio wave, directivity of an antenna for the base station to receive the radio wave is a beam.

(Beam Sweeping)

By sweeping (beam sweeping) a plurality of beam candidates from the base station, the terminal device that is observing the beam candidates can determine which beam the base station uses and which beam the terminal device is easier to receive. On the other hand, when the terminal device transmits a UL reference signal (RS) and the base station receives the RS while performing the beam sweeping, the base station can determine a reception beam that is optimal for receiving the signal from the terminal device.

(Resource for Performing Beamforming)

FIG. 4 is an example of a base station in a case where all weights of antennas are configured by a digital circuit in beamforming. Such a case where all weights of the antennas are configured by the digital circuit in the beamforming is called a full digital antenna architecture. In the case of the full digital, when transmission sweeping (Tx sweeping) is performed, different resources are required as many as the number of beams. On the other hand, when reception sweeping (Rx sweeping), it is possible to simultaneously receive all beams within one resource. Therefore, the full digital antenna architecture can reduce resources at the time of reception sweeping. That is, when the base station performs the reception sweeping of the full digital, the terminal device only needs to transmit a UL resource signal (RS) corresponding to one resource, so power consumption is reduced. Here, the resource is an orthogonal resource using frequency or time. For example, an LTE resource block or a resource element correspond to a resource referred herein.

FIG. 5 is an example of a base station in the case of including a phase shifter of an analogue circuit in the beamforming. The case where the beamforming is implemented with the phase shifter of the analogue circuit called a hybrid antenna architecture of digital and analog. The digital and analog hybrid antenna architecture of FIG. 5 is advantageous in terms of cost because the digital circuit has less hardware. However, in this hybrid antenna architecture, the phase shifter connected to the antenna can express only a unidirectional beam, so both the transmission sweeping and the reception sweeping require resources as many as the number of beams. This means that the terminal device needs to transmit UL RS for all resources corresponding to the number of beams for the reception sweeping of the base station. That is, the power consumption of the terminal device becomes significant.

Considering the actual usage situation, it is assumed that the hybrid architecture illustrated in FIG. 5 will be used, and therefore, it is important how to overcome the shortcomings of the hybrid architecture in which different beams require resources of different frequencies or time.

(Efficiency of Beam Sweeping)

Figure 6:
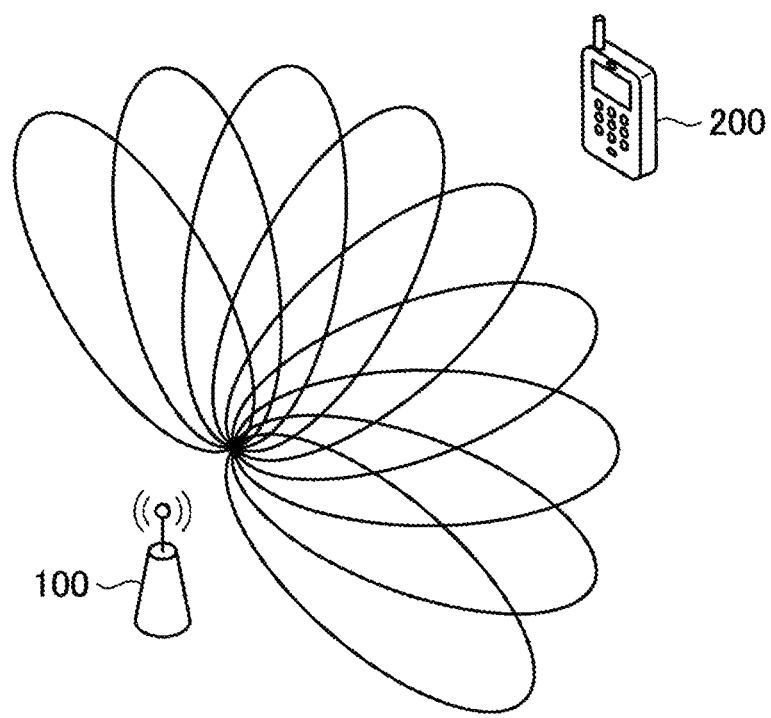
FIG. 6 is an explanatory diagram illustrating an example of beam sweeping using a rough beam.
Figure 7:
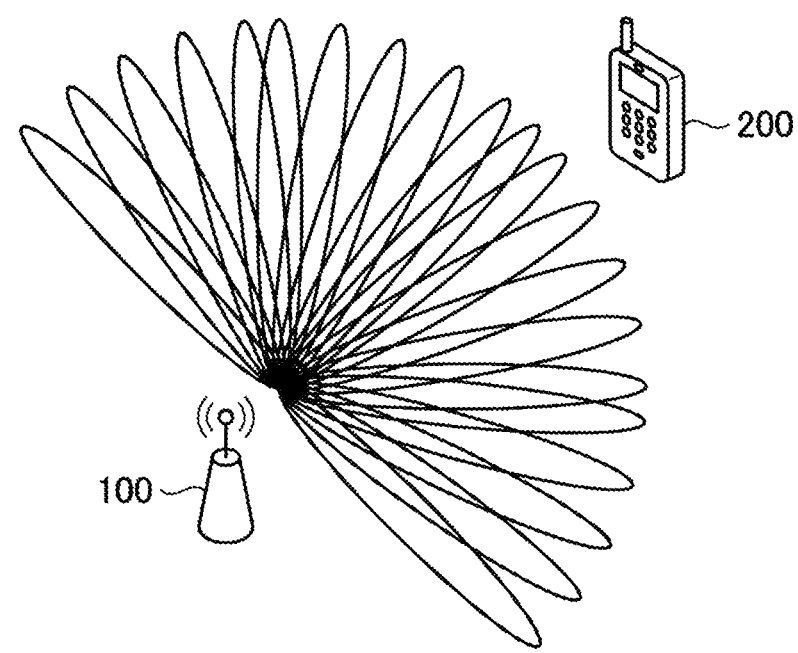
FIG. 7 is an explanatory diagram illustrating an example of beam sweeping using an accurate beam.
Figure 8:
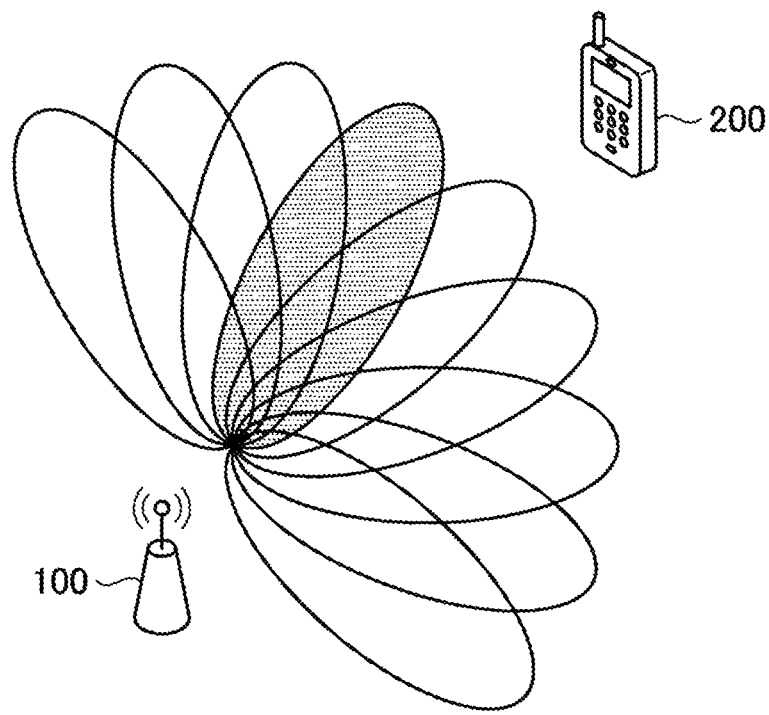
FIG. 8 is an explanatory diagram illustrating an example of the beam sweeping using the rough beam.
Figure 9:
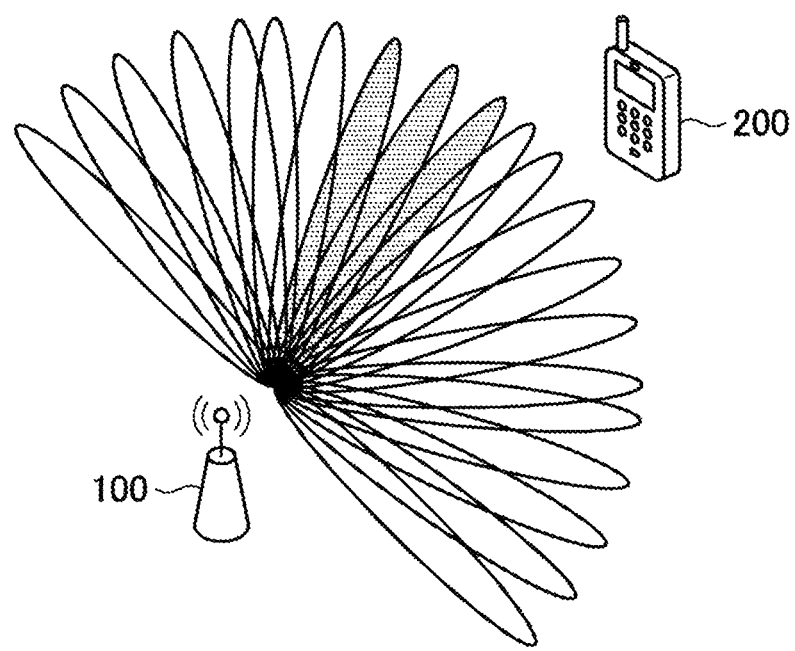
FIG. 9 is an explanatory diagram illustrating an example in which an accurate beam is bundled to form the rough beam.

When the beam is prepared in increments of 1° with respect to a direction of 360° in a horizontal direction, the beam sweeping is performed using 360 resources, and each beam is evaluated one by one, and therefore, a lot of time and more resources are required, and furthermore, the power consumption of the terminal device increases. Therefore, a technology is considered in which the base station generates a rough beam of 10°, uses 36 resources, finds a beam having optimal resolution from beams of 10°, and then, performs beam sweeping using a fine beam (accurate beam) in increments of 1° within the range of 10° to find an optimal beam. In this case, the base station can determine the optimal beam by using resources of 36+10=46, and as a result, can greatly reduce resources from 360 to 46. FIG. 6 is an explanatory diagram illustrating an example of the beam sweeping using the rough beam. In addition, FIG. 7 is an explanatory diagram illustrating an example of the beam sweeping using the accurate beam. The base station may bundle a plurality of accurate beams and use the accurate beams simultaneously to treat a plurality of accurate beams as the rough beams. In this case, for example, by using a plurality of adjacent accurate beams (for example, three) at the same time, the beams are used as the rough beams. The base station may bundle and provide three accurate beams as illustrated in FIG. 9 to generate the rough beam illustrated in FIG. 8. By transmitting the three beams of FIG. 9 at the same time and at the same frequency, a rough beam similar to that of FIG. 8 can be provided.

(Beam Sweeping from a Plurality of Base Stations)

Figure 10:
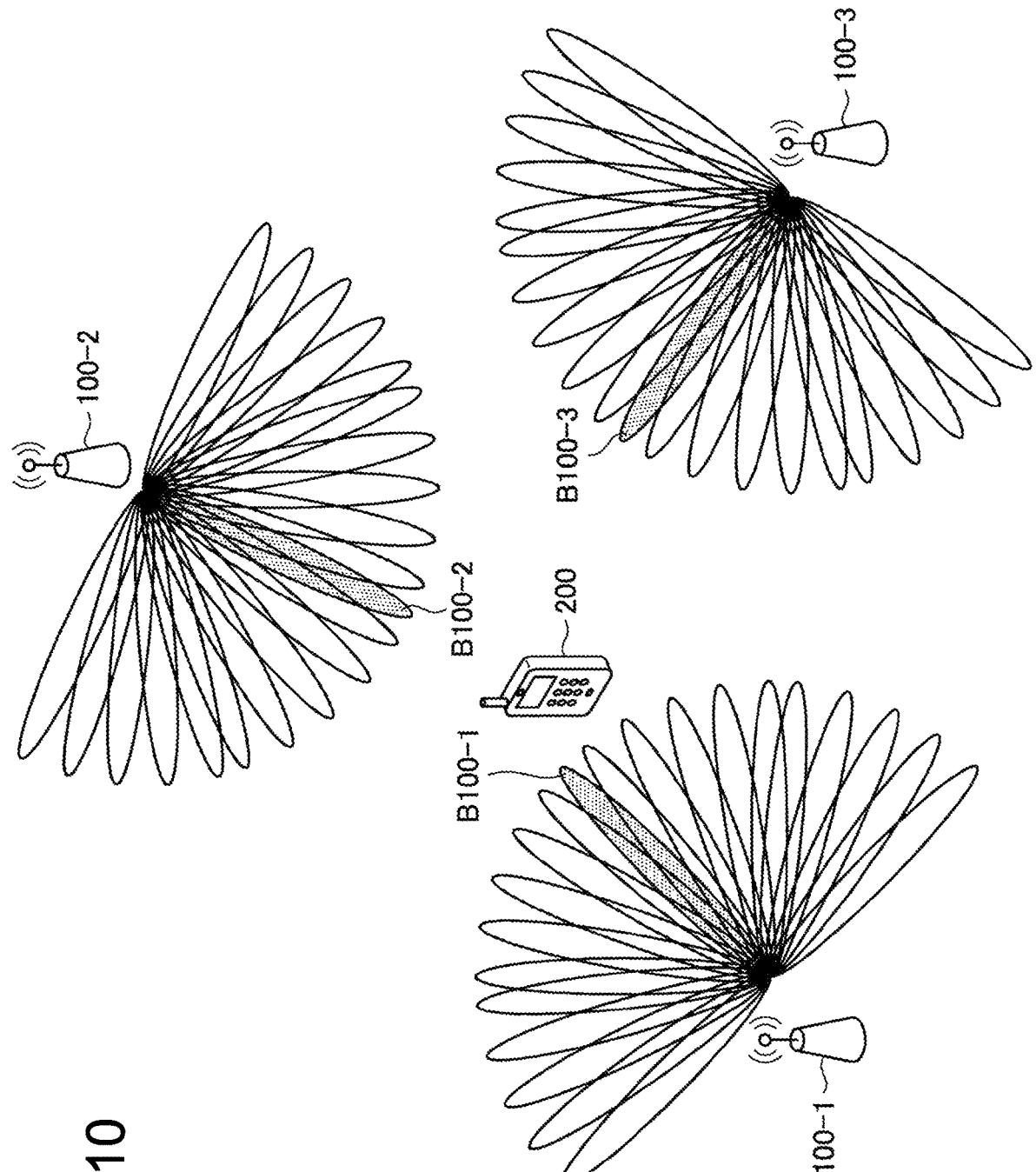
FIG. 10 is an explanatory diagram illustrating an example in a case where a plurality of base stations exist around a terminal.

When there are a plurality of base stations around the terminal device, it is necessary to determine the transmission beams and reception beams of the plurality of base stations for the terminal device. FIG. 10 is an explanatory diagram illustrating an example in a case where a plurality of base stations exist around a terminal device. In the example illustrated in FIG. 10, the optimal beam for the terminal device 200 is a beam B100-1 at base station 100-1, a beam B100-2 at a base station 100-2, and a beam B100-3 at a base station 100-3. A method for determining an optimal beam based on information from the terminal device 200, and finally, determining a base station closest to the terminal device 200 or a main base station among the plurality of base stations 100-1 to 100-3, and instructing other base stations is considered. In this case, one base station needs to determine the transmission beams and reception beams of the plurality of base stations, and as a result, the load on the terminal device increases.

(Channel Reciprocity)

Channel reciprocity means that a UL channel and a DL channel between the base station and the terminal device are the same. In a time division duplex (TDD) system, frequency bands used for UL and DL are the same, and therefore, basically, the channel reciprocity of the UL and DL is established. However, it is necessary to establish the reciprocity in both the analogue circuit of the terminal device and a spatial channel by performing an operation of calibration so that the TX/RX of the base station and the analogue circuit of the terminal device have the same characteristics.

If this channel reciprocity is established, when the terminal device selects the DL beam of the base station, the terminal device informs the base station of numbers of beams, so the UL beam to be used by the base station can be determined without operating the reception sweeping. When the combination of the rough beam and the accurate beam described above (efficiency of beam sweeping) is performed, the following is obtained.

(DL Beam Sweeping Procedure)

Figure 11:
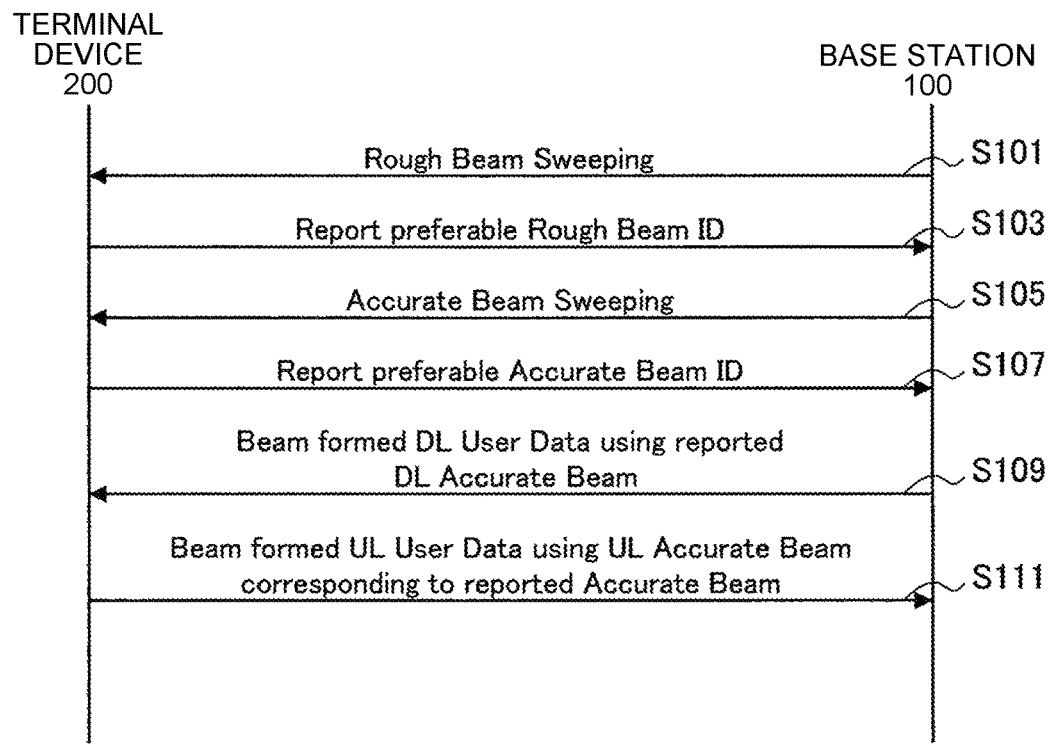
FIG. 11 is an explanatory diagram illustrating an example of a DL beam sweeping procedure performed by the base station and the terminal.

FIG. 11 is an explanatory diagram illustrating an example of a DL beam sweeping procedure performed by the base station 100 and the terminal device 200. First, the transmission sweeping using the rough beam is performed from the base station to the terminal device (step S101). This transmission sweeping is performed according to a sweeping pattern unique to the base station 100. In other words, the transmission sweeping is also called base station-specific or cell specific.

The terminal device 200 reports numbers of preferable rough beams for an own device to the base station 100 (step S103). The terminal device 200 determines the preferable rough beam based on, for example, whether or not the beam has the largest received power when determining the preferable rough beam.

When receiving a report of numbers of rough beams from the terminal device 200, the base station 100 performs the transmission sweeping using the accurate beam corresponding to the rough beam (step S105). The transmission sweeping at this time may be a sweeping pattern unique to the terminal device 200 specially prepared for the terminal device 200. Alternatively, the sweeping pattern is prepared in common for all terminal devices 200, but the base station 100 may notify each terminal device 200 which part to monitor. In the former case, the transmission sweeping pattern itself is unique (UE specific) to the terminal device 200. In the latter case, it can be said that the setting of the transmission sweeping pattern is unique (UE specific) to the terminal device 200.

The terminal device 200 reports numbers of preferable accurate beams for an own device to the base station 100 (step S107). The terminal device 200 determines the preferable accurate beam based on, for example, whether or not the beam has the largest received power when determining the preferable accurate beam.

When receiving a report of numbers of accurate beams from the terminal device 200, the base station 100 transmits the DL user data to the terminal device 200 using the accurate beam (step S109). Note that when the channel reciprocity is secured, the base station 100 receives the UL user data from the terminal device 200 using the same accurate beam as the accurate beam at the time of transmission for reception from the terminal device 200 (step S111).

Note that a beam setting method may be appropriately changed according to system application conditions and use cases. As a specific example, the rough beam may be set commonly to a cell or a base station and shared by a plurality of terminal devices. In this case, each terminal device may monitor the rough beam. In addition, the accurate beam may be customized and provided for each terminal device. Further, as another example, a common accurate beam may be provided to a plurality of terminal devices. In this case, it is possible to provide necessary beams for each terminal device by specifying which beam is monitored for each terminal device.

(Channel State Information (CSI) Acquisition)

When the above beam sweeping procedure is completed, the optimal transmission beam on the base station to be used between the base station and the terminal device can be determined. DL CQI acquisition is to grasp the channel quality and the interference situation when using the determined transmission beam. The DL CQI acquisition is required to notify whether the base station to perform DL data transmission based on which modulation scheme or coding rate is used on the terminal device from the terminal device to the base station with feedback using the UL, which is channel quality indicator (CQI) feedback. To perform this feedback, the base station transmits a DL reference signal from the base station to the terminal device for DL CSI acquisition, receives the DL reference signal for the DL CSI acquisition, and evaluates the channel situations. By doing so, the terminal device can determine a desired CQI (combination of modulation scheme and individual coding rate).

As described above, first, the preferable transmission beam is determined on the base station by the beam sweeping procedure, the CQI is determined on the terminal device in the CSI acquisition procedure, and it is necessary to notify the determined CSI from the terminal device to the base station with the CSI feedback.

(TDD Configuration)

Figure 12:
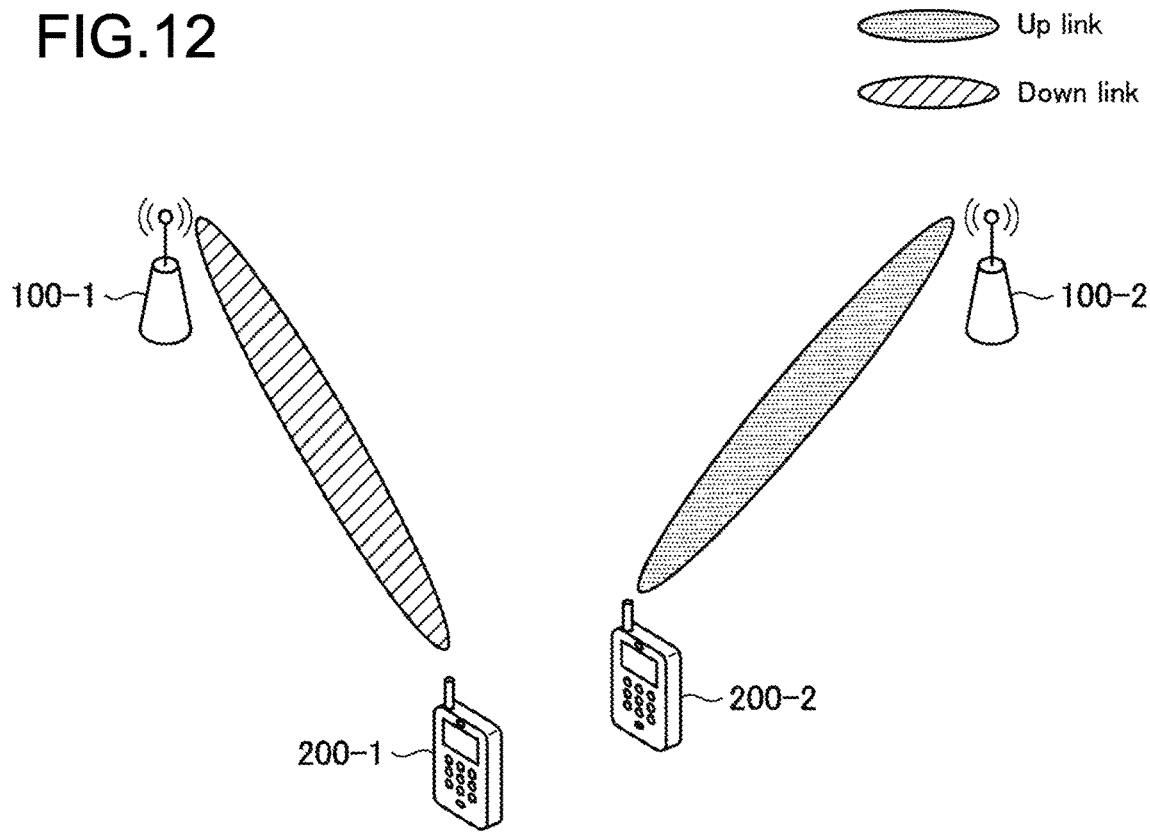
FIG. 12 is an explanatory diagram illustrating an example of a case where UL and DL settings are different between adjacent base stations.

In LTE and NR, UL and DL settings may be different between base stations adjacent to each other. For example, FIG. 12 is an explanatory diagram illustrating an example of a case where UL and DL settings are different between adjacent base stations. In the example illustrated in FIG. 12, it is assumed that each cell corresponding to base stations 100-1 and 100-2 are adjacent to each other. As illustrated in FIG. 12, when a terminal device 200-1 receives a DL signal from the base station 100-1, the terminal device 200-2 may transmit a UL signal to the base station 100-2. Switching between UL and DL is performed in LTE in units called subframes. A subframe is 1 ms, and 10 subframes are 10 ms which is the LTE wireless basic time unit.

A method in which the UL and the DL are switched and used in subframe units is called a time division duplex method. For example, FIG. 13 is an explanatory diagram for describing an example of the TDD configuration. In FIG. 13, "#0" to "#9" indicate subframe numbers. In addition, "U", "D", and "S" indicate "UL subframe", "DL subframe", and "special subframe", respectively. In LTE, seven TDD configurations are defined as illustrated in FIG. 13. In LTE, these configurations can be switched and used every 80 ms, for example. The reason for switching the TDD configuration may be that a ratio of UL and DL traffic may differ for each base station, and in such a case, selecting the TDD configuration in accordance with the traffic for each base station improves the overall network throughput. However, if different TDD configurations are used between adjacent base stations, interference may occur. In LTE, subframes #0, #1, #2, and #5 are common to all TDD configurations, so UL/DL is not different. On the other hand, in subframes #3, #4, and #6 to #9, the UL/DL settings may differ between adjacent base stations.

(Crosslink Interference)

As described above, the interference may occur due to different UL/DL settings between adjacent base stations. In this case, there are two types of interferences are assumed below.

Figure 14:
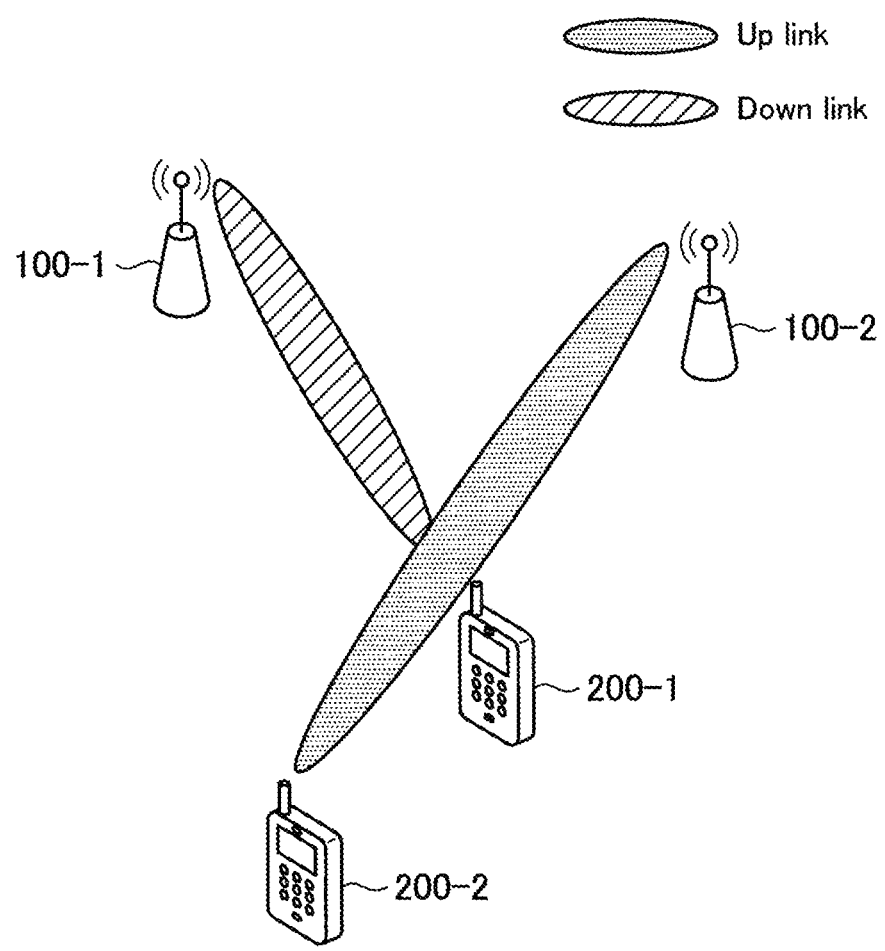
FIG. 14 is an explanatory diagram for describing an overview of interference of a terminal device transmitting UL with a terminal device receiving DL.

Case 1: Interference of the terminal device transmitting UL with the terminal device receiving DL Case 2: Interference of the base station transmitting DL with the base station receiving UL For example, FIG. 14 is an explanatory diagram for describing an overview of the interference of the terminal device transmitting UL with the terminal device receiving DL. As illustrated in FIG. 14, the UL signal transmitted from the terminal device 200-2 to the base station 100-2 may interfere with the terminal device 200-1 receiving the DL signal from the base station 100-1.

Figure 15:
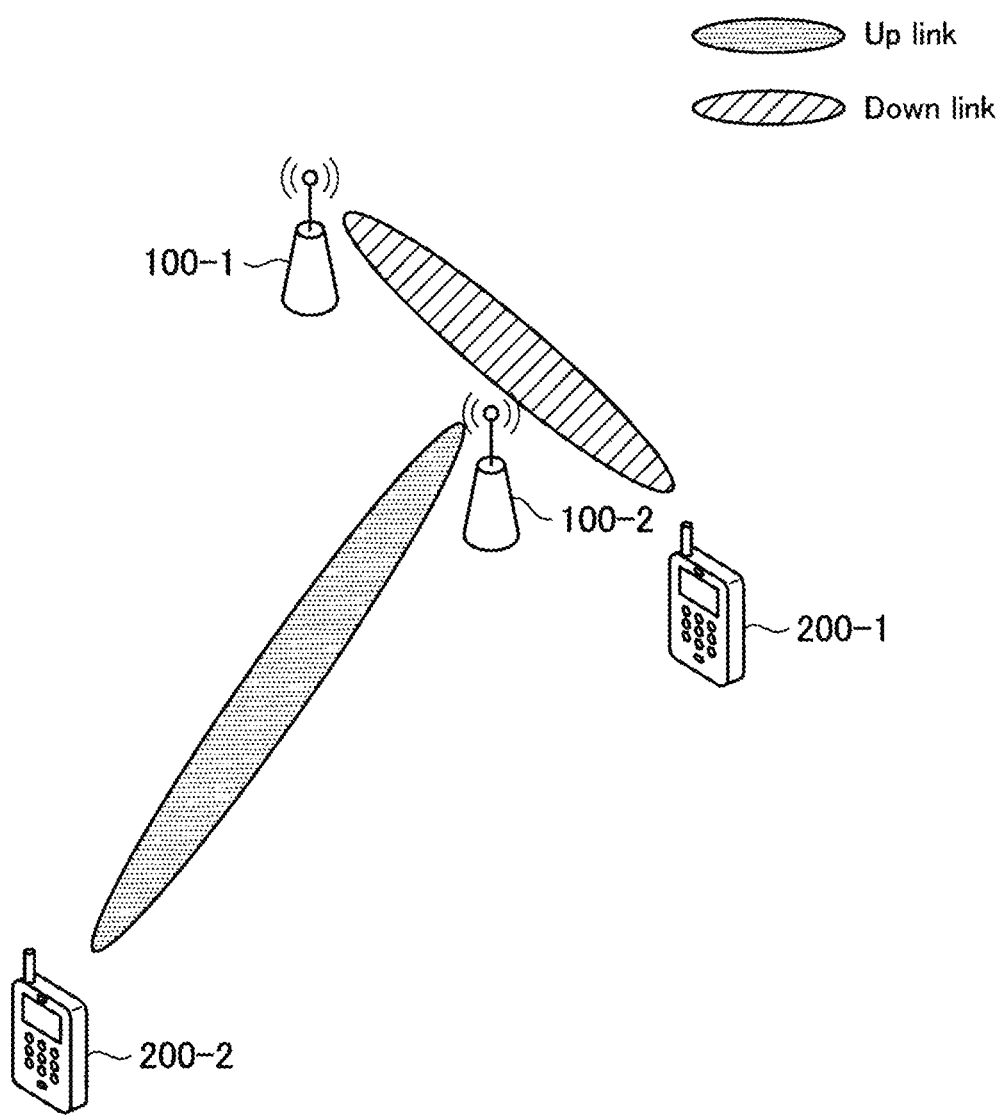
FIG. 15 is an explanatory diagram for describing an overview of interference of a base station transmitting a DL signal with a base station receiving a UL signal.

In addition, FIG. 15 is an explanatory diagram for describing an overview of the interference of the base station transmitting the DL signal with the base station receiving the UL signal. As illustrated in FIG. 15, the DL signal transmitted from the base station 100-1 to the terminal device 200-1 may interfere with the base station 100-2 receiving the UL signal from the terminal device 200-2.

In the present disclosure, a description will be given focusing on the interference of the terminal device transmitting the UL with the terminal device receiving the DL illustrated in FIG. 14. That is, in the following description, when it is referred to as "crosslink interference", unless otherwise specified, the case where the UL signal interferes with the DL signal as illustrated in FIG. 14 will be described. In addition, the crosslink interference is measured using, for example, a UL reference signal of adjacent cells.

(4 Phases where Crosslink Interference is a Problem)

Unlike LTE, in NR, beamforming is generally adapted, and in each of the following four phases, for example, different phases overlap between base stations, and UL/DL may be different between the base stations.

Phase 1: Procedure of transmitting a beamformed synchronization signal by beam sweeping Phase 2: Beam sweeping for beam measurement performed to determine an appropriate beam between the base station and the terminal device Phase 3: channel state information (CSI) acquisition for measuring a channel quality of a specified beam and determining an appropriate modulation scheme and a coding rate Phase 4: Transmit user data at the determined beam, the modulation scheme, and the coding rate In the above four phases, the phase in which the measurement of the crosslink interference is performed is a phase (phase 3) of CSI acquisition. Therefore, in the present disclosure, mainly at the time of the CSI acquisition in the phase 3, the UL reference signals transmitted from other terminal devices are measured, and the behavior of the terminal device that reports the result of the measurement as an interference signal is proposed. Note that the examples described below may be similarly applicable to the phase 2 beam measurement.

That is, in the present disclosure, in order to improve a decrease in throughput due to the interference that occurs when the states of the UL and the DL differ between the base stations, technologies as shown below are focused.

Setting for measurement

Method for reporting measurement result

Technology to improve throughput by imposing various constraints on system

In particular, the present disclosure proposes a method for more accurately estimating an interference of a UL signal of a nearby terminal device with a terminal device receiving a DL signal, and efficiently reporting the interference amount.

3. Technical Features

Hereinafter, technical features of the communication system according to the embodiment of the present disclosure will be described.

(Basic Configuration)

In the example illustrated in FIG. 14, the CSI acquisition is performed to estimate with which modulation scheme/ coding rate the terminal device 200-1 can receive the DL signal. In such a situation, it is necessary to correctly estimate the interference of the UL signal transmitted from the terminal device 200-2 with the DL signal received by the terminal device 200-1. In this case, it is necessary to specify the terminal device that gives the interference and measure the interference, but the conventional protocol does not specify the method.

That is, it is important to estimate the interference due to the UL signals transmitted from other terminal devices in the CSI acquisition phase (phase 3) of phases 1 to 4 described above. Specifically, in the beam measurement, the UL beam sweeping is performed according to antennas mounted in other terminal devices, so measuring the interference for the entire UL beamforming is a burden on the terminal device that measures the interference. On the other hand, in the CSI acquisition, the beam used by the terminal device that gives the interference is limited, so the number of beams that measure the interference is limited, and the burden on the terminal device that measures the interference is reduced.

In order for the terminal device to transmit the UL reference signal for the CSI acquisition, the UE-specific signaling sets up at what time and how the base station transmits the UL reference signal. Here, the UE-specific signaling setting means that the setting for the terminal device is performed by the terminal device-specific signaling. The conventional protocol does not specify the setting method and setting content as described above.

In particular, the UL reference signal transmitted from the terminal device is determined by a UE-specific ID, and a random sequence function generates a random sequence based on the ID. Therefore, the terminal device that measures interference needs to know what ID is used to generate the random sequence. Therefore, an example of a mechanism for allowing a terminal device measuring interference to recognize an ID based on a random sequence corresponding to a UR reference signal transmitted from the terminal device that may be an interference source will be described below.

Specifically, the base station 100 notifies of the terminal device 200-1, which performs the interference measurement, information on setting for transmitting a UL reference signal by another terminal device 200-2 (that is, terminal device that may be an interference source). The setting includes, for example, a time and a frequency location at which another terminal device 200-2 transmits the UL reference signal, a random sequence ID, information on frequency hopping, and the like. An example of configuration set for each item is summarized below (Table 1).

TABLE 1

General example of Configuration that base station sets

| Example of set item | Example of Configuration |
| --- | --- |
| Sequence ID | root function or initial ID (ID unique to terminal and the like) used in Random sequence generator |
| Time resource | offset with time period |
| Frequency resource | Location in frequency bandwidth which is in operation |
| Frequency hopping | Frequency hopping pattern |

Note that the sequence ID for each other terminal device 200-2 may be notified to each terminal device 200-1 for measuring interference. With this configuration, even if there is interference from a device different from a certain terminal device 200-2, it is possible to acquire only the interference component coming from the terminal device 200-2. This is because it is possible to acquire only the interference component to be measured by receiving power while correlating with a known code sequence in advance. Note that the sequence ID set for transmitting the UL reference signal corresponds to an example of "first identification information".

Examples of the interference components that are not preferred to be acquired include interference from non-target terminal devices or interference by a DL signal of a cell performing DL. In addition, simply by measuring interference only by electric power, a signal that is not preferred to be acquired may be captured as an interference signal. Therefore, it is more preferable to use a signal with the longest possible sequence length.

When the base station 100 causes the terminal device 200 to measure interference from the terminal device 200 that is a source of the interference, it is possible to apply various algorithms to this operation as an implementation on the base station 100. In the present disclosure, the implementation is not particularly described. For example, the positional information of the plurality of terminal devices 200 is grasped, so the base station 100 can grasp the positional relationship between the terminal devices 200 or the positional relationship between the terminal device 200 and the base station 100. Thereby, the base station 100 can also determine the terminal device 200 that transmits the UL reference signal and the terminal device 200 that measures the interference due to the UL reference signal transmitted from the transmitting side terminal device 200.

Figure 16:
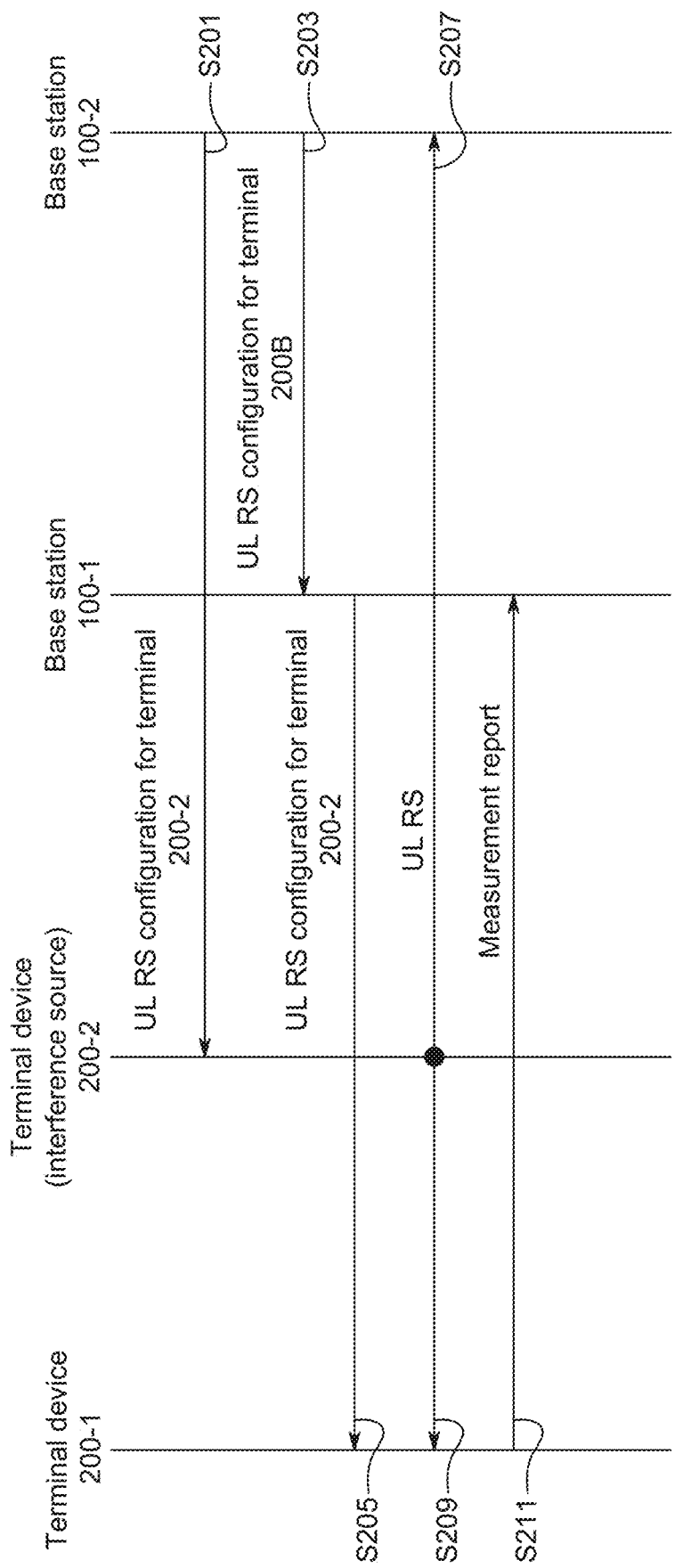
FIG. 16 is a sequence diagram illustrating an example of a flow of a series of processing of a communication system according to an embodiment.

Here, an example of a procedure flow related to the measurement of crosslink interference will be described with reference to FIG. 16. FIG. 16 is a sequence diagram illustrating an example of a flow of a series of processing of the communication system according to the present embodiment, and illustrates an example of a procedure related to measurement of crosslink interference. The example illustrated in FIG. 16 illustrates an example of a case in which the terminal device 200-1 measures the crosslink interference from the terminal device 200-2 based on the UL reference signal transmitted from the terminal device 200-2. It is assumed that a serving base station of the terminal device 200-1 is the base station 100-1 and the serving base station of the terminal device 200-2 is the base station 100-2.

As illustrated in FIG. 16, the base station 100-2 (communication control unit 151) performs setting for the terminal nal device 200-2 to transmit the UL reference signal to the terminal device 200-2 located in its own communication range (within a cell). Then, the base station 100-2 (notification unit 155) notifies the terminal device 200-2 of information on the setting for transmitting the UL reference signal (S201). Further, the base station 100-2 (notification unit 155) notifies the base station 100-1 of the adjacent cells of the information on the setting corresponding to the UL reference signal via the inter-base station interface (S203).

The base station 100-1 (information acquisition unit 153) acquires, from the base station 100-2, information (for example, information on the settings) on the UL reference signal transmitted from the terminal device 200-2. The base station 100-1 (communication control unit 151) sets (allocates) resources for the terminal device 200-1 located in its own communication range (within a cell) to measure the crosslink interference based on the information acquired from the base station 100-2. The resource for measuring the crosslink interference is also referred to as "crosslink interference measurement resource (CLI-IMR)". Then, the base station 100-1 (notification unit 155) notifies the terminal device 200-1 of information on the UL reference signal (S205).

The terminal device 200-2 (communication control unit 241) transmits the UL reference signal to the base station 100-2 based on the information notified from the base station 100-2 (S207). At this time, the UL reference signal is also received by other terminal devices (for example, terminal device 200-1) located near the terminal device 200-2.

The terminal device 200-1 (measurement unit 245) receives the UL reference signal transmitted from the terminal device 200-2 based on the information acquired from the base station 100-1 (S209), and measures the crosslink interference based on the reception result of the UL reference signal. Then, the terminal device 200-1 (notification unit 247) notifies (reports) the information according to the measurement result of the crosslink interference to the base station 100-1 (S211).

In the example illustrated in FIG. 16, the case where only the terminal device 200-2 is the interference source has been described, but the number of terminal devices 200 that may be the interference source is not necessarily limited to one. As a specific example, there is the case where the plurality of terminal devices 200 may be the interference source of the crosslink interference. In such a case, for example, the procedure described with reference to FIG. 16 may be executed by the number of terminal devices 200 that may be the interference source.

In addition, in the example described above, the terminal device 100-1 for measuring the crosslink interference corresponds to an example of a "first terminal device", and the base station 100-1, which is the serving base station of the terminal device 100-1, corresponds to as an example of the "first terminal device". In addition, the terminal device 100-2 serving as a transmission source of the UR reference signal corresponds to an example of a "second terminal device", and the base station 100-2, which is the serving base station of the terminal device 100-2, corresponds to as an example of the "second base station". In addition, the information notified from the base station 100-2 to the base station 100-1, that is, the information on the UL reference signal transmitted from the terminal device 200-2 corresponds to an example of the "first information". In addition, the information notified from the base station 100-1 to the terminal device 100-1 for the terminal device 100-1 to measure the crosslink interference corresponds to an example of the "second information". In addition, the report from the terminal device 100-1 to the base station 100-1 according to the measurement result of the crosslink interference corresponds to an example of "third information".

Hereinabove, an example of the procedure flow related to the measurement of the crosslink interference will be described with reference to FIG. 16.

(Modification 1)

Next, a modification of the communication system according to the embodiment of the present disclosure will be described. Hereinafter, the present modification is also referred to as "Modification 1".

As described above, there is the case where the plurality of terminal devices 200 may be the interference source of the crosslink interference. In such a case, when the measurement of the crosslink interference is performed based on the procedure illustrated in FIG. 16, for example, the base station 100 may notify the terminal device 200-1 of the information on the setting of the UL reference signal for each other terminal device 200, and the processing may be complicated. In particular, considering the sequence ID generated based on an ID unique to the terminal device 200 or the operation according to the frequency hopping different for each terminal device 200, the procedure for measuring the crosslink interference is highly likely to be complicated.

For example, the terminal device 200 may transmit the UL reference signal using a part of the available frequency bands. With such control, for example, frequency division multiplexing can be performed, and power consumption can be saved. When the UL reference signal is transmitted using a narrow band as described above, it may be assumed that the frequency hopping is performed within a subframe and the frequency hopping is performed between different subframes. In such a situation, when the interference of another terminal device 200 is measured, since the interference component is acquired by receiving the UL reference signal transmitted from the terminal device 200 in consideration of different frequency hopping for each terminal device 200, the operation tends to be complicated.

In view of such a situation, common setting may be performed on the plurality of terminal devices 200 as the setting of the UL reference signal used for the measurement of the crosslink interference. Examples of the common setting include the setting described above with reference to Table 1, that is, the time and frequency location at which the UL reference signal is transmitted, the ID of the random sequence, the information on the frequency hopping, and the like. In this case, the UL reference signal transmitted from the terminal device 200 (for example, terminal device 200-2) that may be the interference source may be transmitted by dividing a UL reference signal for the conventional UL CSI acquisition and a UL reference signal used for measuring the crosslink interference into two types. In this case, for the UL reference signal for the conventional UL CSI acquisition, the setting unique to the terminal device 200 may be used. On the other hand, for the UL reference signal used for measuring the crosslink interference, for example, setting unique to a measurement unit may be used.

For example, terminal devices 200-2 to 200-4 are assumed as the terminal device 200 that may be the interference source, and the terminal device 200-1 measures interference based on UL reference signals transmitted from each of the terminal devices 200-2 to 200-4. In this case, the base station 100-2 serving as the serving base station of the terminal devices 200-2 to 200-4 may perform common setting as the setting (for example, sequence ID) for transmitting the UL reference signal to the terminal devices 200-2 to 200-4, and notify the adjacent base station 100-1 of the information on the setting. In this case, the above-described first identification information (that is, sequence ID) is commonly set to the terminal devices 200-2 to 200-4.

Figure 17:
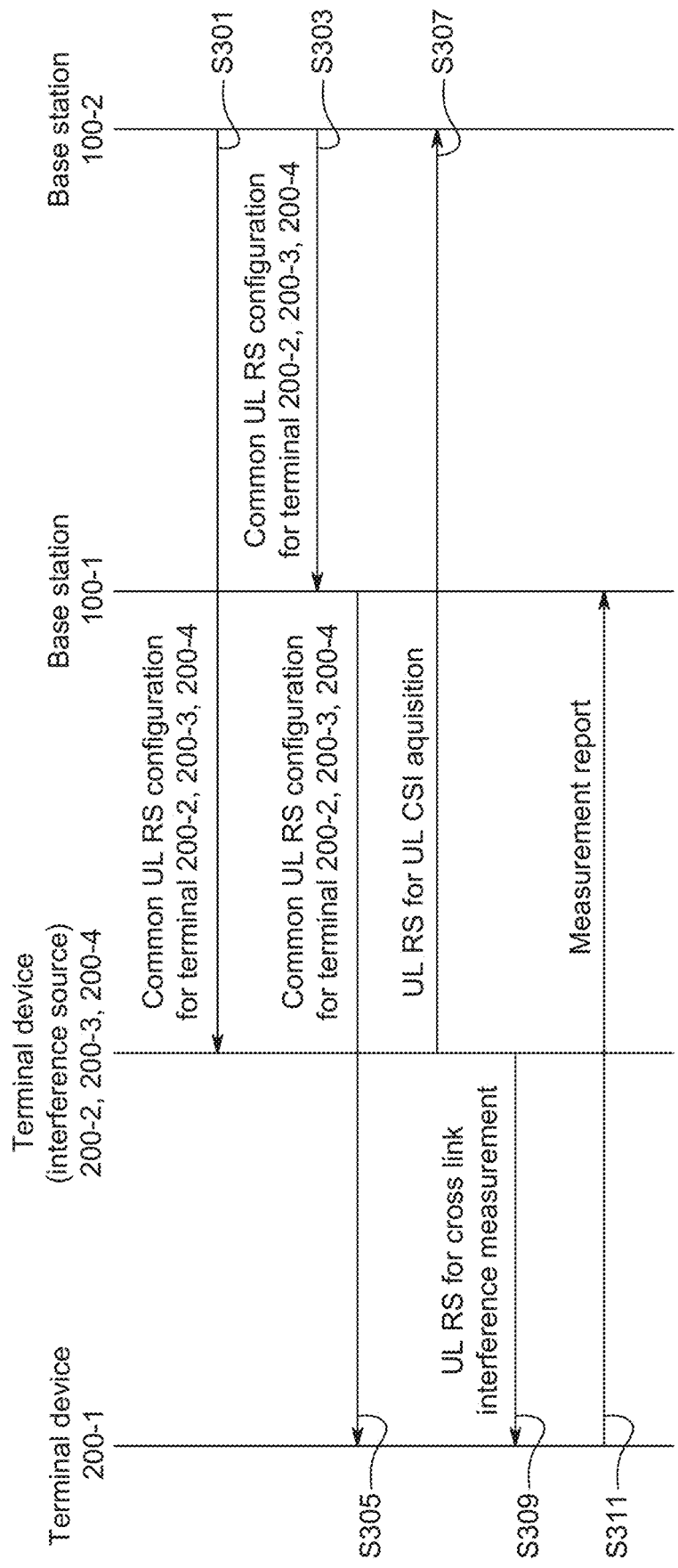
FIG. 17 is a sequence diagram illustrating an example of a flow of a series of processing of a communication system according to Modification 1.

Here, an example of a procedure flow related to the measurement of the crosslink interference in the communication system according to Modification 1 will be described with reference to FIG. 17. FIG. 17 is a sequence diagram illustrating an example of a flow of a series of processing of the communication system according to Modification 1, and illustrates an example of a procedure related to measurement of crosslink interference. In the example illustrated in FIG. 17, the terminal devices 200-2 to 200-4 correspond to the terminal device 200 that may be the interference source. In addition, the terminal device 200-1 corresponds to the terminal device 200 that measures the crosslink interference from the terminal devices 200-2 to 200-4 based on the UL reference signal transmitted from the terminal devices 200-2 to 200-4. It is assumed that the serving base station of the terminal device 200-1 is the base station 100-1 and the serving base station of the terminal devices 200-2 to 200-4 is the base station 100-2.

As illustrated in FIG. 17, the base station 100-2 (communication control unit 151) performs setting for the terminal devices 200-2 to 200-4 to transmit the UL reference signal to the terminal devices 200-2 to 200-4 located in its own communication range (within a cell). At this time, the base station 100-2 performs the common setting for the terminal devices 200-2 to 200-4 as the settings for transmitting the UL reference signal. Then, the base station 100-2 (notification unit 155) notifies each of the terminal devices 200-2 to 200-4 of information on the setting for transmitting the UL reference signal (S301). Further, the base station 100-2 (notification unit 155) notifies the information on the setting corresponding to the UL reference signal to the base station 100-1 of the adjacent cells via the inter-base station interface (S303).

The base station 100-1 (information acquisition unit 153) acquires, from the base station 100-2, the information (for example, information on the settings) on the UL reference signals that are commonly set to the terminal devices 200-2 to 200-4 and transmitted from the terminal devices 200-2 to 200-4. The base station 100-1 (communication control unit 151) sets resources (CLI-IMR) for the terminal device 200-1 located in its own communication range (within a cell) to measure the crosslink interference based on the information acquired from the base station 100-2. Note that the resource is used for measuring the crosslink interference based on the UL reference signal transmitted from each of terminal devices 200-2 to 200-4. Then, the base station 100-1 (notification unit 155) notifies the terminal device 200-1 of information on the UL reference signal (S305).

The terminal device 200-2 (communication control unit 241) transmits the UL reference signal for the UL CSI acquisition to the base station 100-2 based on the information notified from the base station 100-2 (S307). At this time, the UL reference signal is also received by other terminal devices (for example, terminal device 200-1) located near the terminal device 200-2. At this time, the UL reference signals received by the other terminal devices are used for measuring the crosslink interference. Note that the operations of the terminal devices 200-3 and 200-4 are the same as that of the terminal device 200-2.

The terminal device 200-1 (measurement unit 245) receives the UL reference signal that is transmitted from each of the terminal devices 200-2 to 200-4 and common to the terminal devices 200-2 to 200-4, based on the information acquired from the base station 100-1 (S309). In addition, the terminal device 200-1 measures the crosslink interference based on the reception result of the UL reference signals from each of the terminal devices 200-2 to 200-4. Then, the terminal device 200-1 (notification unit 247) notifies (reports) the information according to the measurement result of the crosslink interference to the base station 100-1 (S311).

Hereinabove, with reference to FIG. 17, an example of a procedure flow related to the measurement of the crosslink interference in the communication system according to Modification 1 has been described.

(Modification 2)

Next, another modification of the communication system according to the embodiment of the present disclosure will be described. Hereinafter, the present modification is also referred to as "Modification 2".

In the case of measuring a plurality of DL beams and reporting the measurement result of the plurality of DL beams in a single measurement report, conventionally, after each beam is specified, a modulation scheme/coding rate considering interference due to a channel quality indicator (CQI) and the like can be reported from a terminal device 200 to a base station 100. It is possible to specify a beam using, for example, IDs of configurations of reference signals for each beam. If a report on which of the DL reference signal configurations is specified in one report by setting configurations of beamformed DL reference signals for each DL beam, it is possible to perform a report on a plurality of DL beams with one report.

On the other hand, since the UL reference signal is only received by the base station 100 in the conventional standard, the situation in which the terminal device 200 reports by specifying the configuration of the UL reference signal from another terminal device 200 is not assumed. Therefore, in the present modification, an example of a mechanism for performing the report by specifying the configuration of the UL reference signal is proposed. In the following description, the configuration of the UL reference signal is also referred to as "UL RS configuration" or "CL RS configuration".

Specifically, in the present application example, the terminal device 200 performs the report on the UL reference signal by using (for example, by associating the URI) uplink reference signal identification (URI) corresponding to the UL RS configuration used for measurement of each crosslink interference. In addition, when K (K is a natural number of 2 or more) UL RS configuration is set, the terminal device 200 may specify (in other words, associate URIs) URIs for N (N is a natural number less than K) UL RS configuration selected from the K settings to report information on a channel considering the interference such as CQI. In addition, the terminal device 200 may report reference signal received power (RSRP) of the interference source. Note that the URI corresponds to an example of "second identification information".

With the above-described control, the terminal device 200 can also measure, for example, the amount of interference by distinguishing each of the plurality of terminal devices 200 that can cause the crosslink interference, and report the measurement result individually.

In addition, the above-described control can report the measurement result of the interference, for example, by distinguishing between interference occurring between DL signals and the crosslink interference. That is, by specifying the URI in the case of the report of the crosslink interference, it is possible to distinguish between the report on the interference occurring between the DL signals and the report on the crosslink interference according to the presence or absence of the URI.

Note that a criterion for specifying an interference source that performs the report by specifying the URI may be set in the terminal device 200 performing the report by the base station 100.

For example, for a UL reference signal having RSRP equal to or greater than a threshold, the URI corresponding to the UL reference signal may be reported. As a specific example, for a UL reference signal having RSRP of −70 dB or more, the corresponding URI may be reported.

As another example, for a UL reference signal whose relative value to the DL beam is 30 dB or more, a URI corresponding to the UL reference signal may be reported. As a specific example, when the RSRP of the DL beam is −60 dB, a UL reference signal of −90 dB or more may be set as a target for reporting the crosslink interference, and the URI of the UL reference signal may be reported.

In addition, instead of reporting the interference itself, the quality of the channel assuming the set interference may be reported. In this case, for example, the CQI may be reported without specifying the URI.

In addition, when some UL reference signals are excluded from the target of the report on the crosslink interference, the URI corresponding to the excluded UL reference signals may be notified to the base station 100. As a specific example, when there are five terminal device 200 that may be an interference source, the CQI for the five terminal devices 200 may be reported, or the CQI for the remaining two terminal devices excluding three of the five terminal devices 200 may be reported. In addition, when the remaining two excluding three of the five terminal devices are reported, for three terminal devices excluded, the corresponding URIs may be reported. With such control, the base station 100 can specify three terminal devices 200 for which no CQI is reported based on the notified URI.

Figure 18:
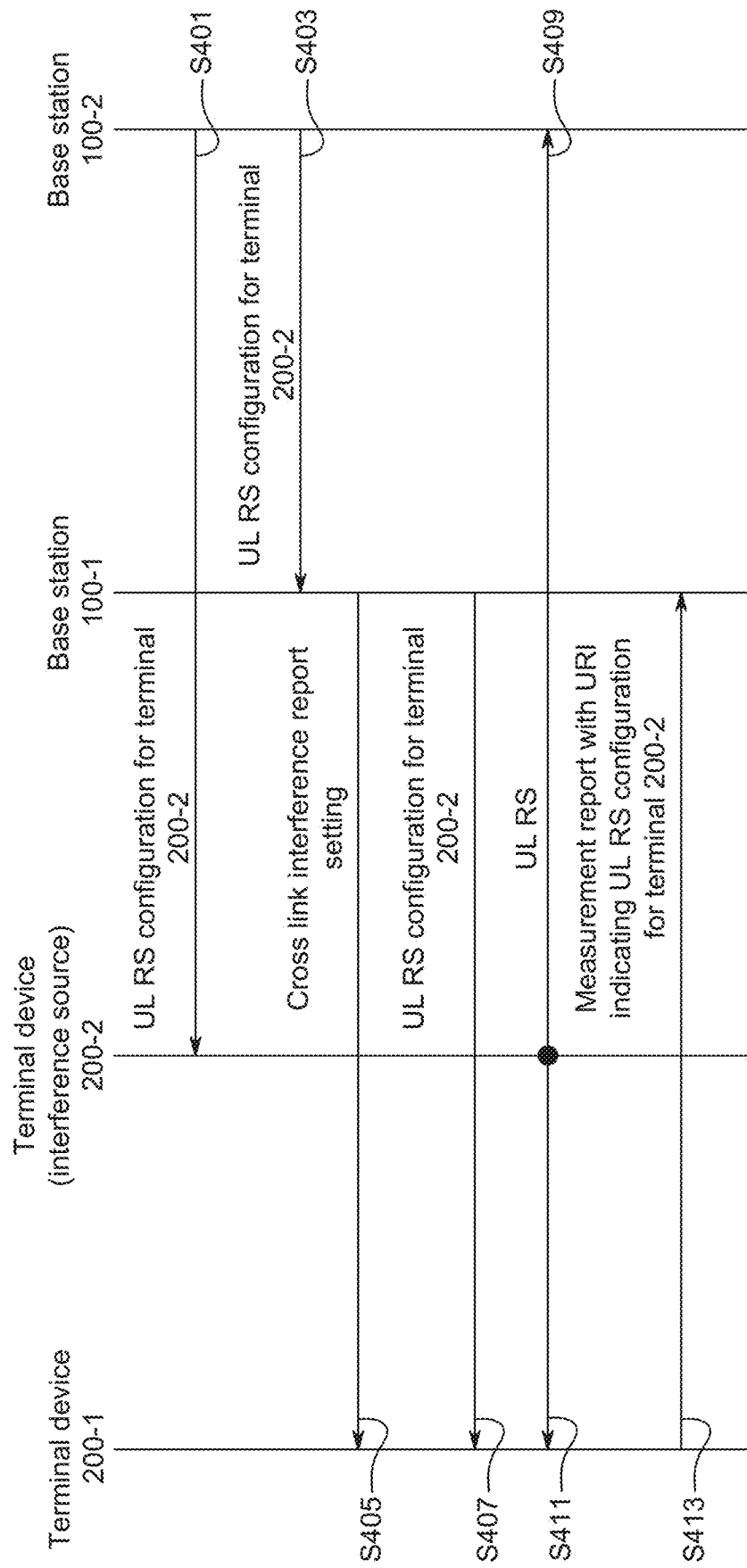
FIG. 18 is a sequence diagram illustrating an example of a flow of a series of processing of a communication system according to Modification 2.

Here, an example of a procedure flow related to the measurement of the crosslink interference in the communication system according to Modification 2 will be described with reference to FIG. 18. FIG. 18 is a sequence diagram illustrating an example of a flow of a series of processing of the communication system according to Modification 2, and illustrates an example of a procedure related to measurement of crosslink interference. In the example illustrated in FIG. 18, the terminal device 200-2 corresponds to the terminal device 200 that may be the interference source. In addition, the terminal device 200-1 corresponds to the terminal device 200 that measures the crosslink interference from the terminal device 200-2 based on the UL reference signal transmitted from the terminal devices 200-2. It is assumed that a serving base station of the terminal device 200-1 is the base station 100-1 and the serving base station of the terminal device 200-2 is the base station 100-2.

As illustrated in FIG. 18, the base station 100-2 (communication control unit 151) performs setting for the terminal device 200-2 to transmit the UL reference signal to the terminal device 200-2 located in its own communication range (within a cell). Then, the base station 100-2 (notification unit 155) notifies the terminal device 200-2 of information on the setting for transmitting the UL reference signal (S401). Further, the base station 100-2 (notification unit 155) notifies the information on the setting corresponding to the UL reference signal to the base station 100-1 of the adjacent cells via the inter-base station interface (S403).

The base station 100-1 (information acquisition unit 153) acquires, from the base station 100-2, information (for example, information on the settings) on the UL reference signal that is configured in the terminal device 200-2 and transmitted from the terminal device 200-2. For the terminal device 200-1 located within its own communication range (within a cell), The base station 100-1 (communication control unit 151) may allow the terminal device 200-1 to perform the setting for the report according to the measurement result of the crosslink interference from the terminal device 200-2 (S405). In addition, the base station 100-1 (communication control unit 151) sets resources for terminal device 200-1 to measure the crosslink interference based on the information acquired from the base station 100-2. Then, the base station 100-1 (notification unit 155) notifies the terminal device 200-1 of information on the UL reference signal (S407).

The terminal device 200-2 (communication control unit 241) transmits the UL reference signal to the base station 100-2 based on the information notified from the base station 100-2 (S307). At this time, the UL reference signal is also received by other terminal devices (for example, terminal device 200-1) located near the terminal device 200-2.

The terminal device 200-1 (measurement unit 245) receives the UL reference signal transmitted from the terminal device 200-2 based on the information acquired from the base station 100-1 (S411), and measures the crosslink interference based on the reception result of the UL reference signal. Then, the terminal device 200-1 (notification unit 247) associates the URI corresponding to the UL reference signal with information corresponding to the measurement result of the crosslink interference based on the conditions instructed from the base station 100-1, and notifies (reports) the information to the base station 100-1 (S413).

Hereinabove, an example of a procedure flow related to the measurement of the crosslink interference in the communication system according to Modification 2 has been described with reference to FIG. 18.

With the above-described control, for example, when there is a possibility that crosslink interference may occur, the base station 100 can prevent the occurrence of the crosslink interference by controlling the schedule (for example, controlling timing and the like of directing a beam to the terminal device 200). That is, the base station 100 can also separate the terminal device 200 within the communication range (within a cell) from the interference source of the crosslink interference.

(Modification 3)

Next, another modification of the communication system according to the embodiment of the present disclosure will be described. Hereinafter, the present modification is also referred to as "Modification 3".

When the terminal device 200 receives the DL signal by the channel quality indicator (CQI), there is a signal interference noise ratio (SINR) as information necessary for reporting a recommended value for the preferred modulation scheme and coding rate to the base station 100. The SINR is calculated based on power of a desired signal, an interference signal, and a noise signal, respectively. When the crosslink interference is assumed, the interference signal to be considered when calculating the SINR includes a DL signal for another terminal device 200 and a UL signal transmitted from another terminal device 200. Note that it may be difficult to receive the above two types of interference signals (that is, the DL signal and the UL signal) in the same subframe from the viewpoint of scheduling. Therefore, the terminal device 200 uses desired signal power, DL interference signal power, UL interference signal power, and noise power that are separately acquired to calculate the SINR based on a calculation formula shown below (Equation 1).

SINR=Desired signal power/(DL interference signal power+UL interference signal power+noise power) (1)

The CQI indicates the modulation scheme and the coding rate where information can be transmitted with the SINR. As can be seen from the above (Equation 1), the SINR considering the crosslink interference is calculated using signals related to UL users and DL users as the interference signals. Therefore, the CQI determined according to the SINR (that is, SINR considering the crosslink interference) calculated based on (Equation 1) is hereinafter also referred to as "crosslink multi-user CQI (CL-MU-CQI)". The CQI determined considering the interference between the DL users is also referred to as "multi-user CQI (MU-CQI)" in the conventional protocol. Note that the CL-MU-CQI corresponds to an example of "information corresponding to a first indicator", and the MU-CQI corresponds to an example of "information corresponding to a second indicator".

On the other hand, in the conventional protocol, there is no provision related to the CL-MU-CQI, and therefore there is no provision on how to report the CL-MU-CQI. Therefore, in the present modification, an example of a mechanism for reporting the above-described CL-MU-CQI will be described.

Specifically, the terminal device 200 may report the MU-CQI and the CL-MU-CQI individually. Further, as another example, the terminal device 200 may separately report the MU-CQI and the CL-MU-CQI in one report.

Figure 19:
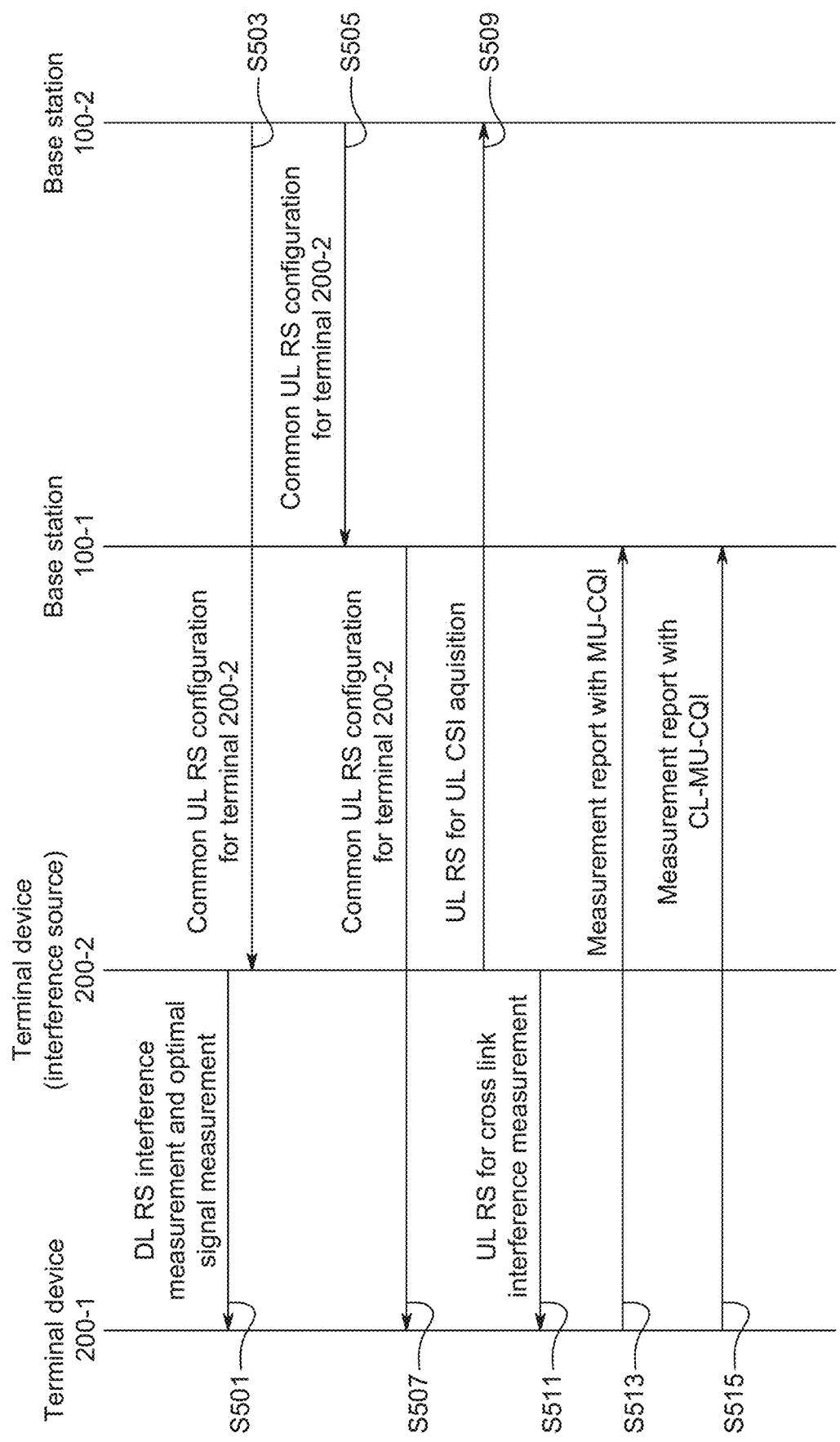
FIG. 19 is a sequence diagram illustrating an example of a flow of a series of processing of a communication system according to Modification 3.

Here, an example of a procedure flow related to the measurement of the crosslink interference in the communication system according to Modification 3 will be described with reference to FIG. 19. FIG. 19 is a sequence diagram illustrating an example of a flow of a series of processing of the communication system according to Modification 3, and illustrates an example of a procedure related to measurement of crosslink interference. In the example illustrated in FIG. 19, the terminal device 200-2 corresponds to the terminal device 200 that may be the interference source. In addition, the terminal device 200-1 corresponds to the terminal device 200 that measures the crosslink interference from the terminal device 200-2 based on the UL reference signal transmitted from the terminal devices 200-2. It is assumed that a serving base station of the terminal device 200-1 is the base station 100-1 and the serving base station of the terminal device 200-2 is the base station 100-2.

As illustrated in FIG. 19, the terminal device 200-2 (communication control unit 241) transmits the DL reference signal to surrounding communication devices (for example, terminal device 200-1) for the measurement of the interference and the measurement of the optimal signal (S501). The terminal device 200-1 (measurement unit 245) calculates the SINR based on the reception result of the DL reference signal transmitted from the terminal device 200-2, and determines the MU-CQI notified to the base station 100-1 according to the SINR calculation result. Note that the MU-CQI is determined according to the SINR calculated based on the calculation formula shown below (Equation 2).

SINR=Desired signal power/(DL interference signal power of paired UE+noise power) (2)

The base station 100-2 (communication control unit 151) performs the setting for the terminal device 200-2 to transmit the UL reference signal to the terminal device 200-2 located in its own communication range (within a cell). Then, the base station 100-2 (notification unit 155) notifies the terminal device 200-2 of information on the setting for transmitting the UL reference signal (S503). Further, the base station 100-2 (notification unit 155) notifies the information on the setting corresponding to the UL reference signal to the base station 100-1 of the adjacent cells via the inter-base station interface (S505).

The base station 100-1 (information acquisition unit 153) acquires, from the base station 100-2, information (for example, information on the settings) on the UL reference signal that is configured in the terminal device 200-2 and transmitted from the terminal device 200-2. The base station 100-1 (communication control unit 151) sets resources for the terminal device 200-1 located in its own communication range (within a cell) to measure the crosslink interference based on the information acquired from the base station 100-2. Then, the base station 100-1 (notification unit 155) notifies the terminal device 200-1 of information on the UL reference signal (S507).

The terminal device 200-2 (communication control unit 241) transmits the UL reference signal to the base station 100-2 based on the information notified from the base station 100-2 (S509). At this time, the UL reference signal is also received by other terminal devices (for example, terminal device 200-1) located near the terminal device 200-2. At this time, the UL reference signals received by the other terminal devices are used for measuring the crosslink interference.

The terminal device 200-1 (communication control unit 241) receives the UL reference signal transmitted from the terminal device 200-2 based on the information acquired from the base station 100-1 (S511). The terminal device 200-1 (measurement unit 245) calculates the SINR based on the reception result of the UL reference signal, and determines the CL-MU-CQI notified to the base station 100-1 according to the SINR calculation result. Note that the CL-MU-CQI is determined according to the SINR calculated based on the calculation formula shown below (Equation 3).

$$SINR = \text{Desired signal power}/(DL \text{ interference signal power of paired } DL\ UE + UL \text{ interference signal power of paired } UL\ UE + \text{noise power}) \quad (3)$$

Then, the terminal device 200-1 (notification unit 247) notifies (reports) the MU-CQI determined based on the reception result of the DL reference signal transmitted from the terminal device 200-2 to base station 100-1 (S513). In addition, the terminal device 200-1 (notification unit 247) notifies (reports) the CL-MU-CQI determined based on the reception result of the UL reference signal transmitted from the terminal device 200-2 to base station 100-1 (S515).

Hereinabove, an example of a procedure flow related to the measurement of the crosslink interference in the communication system according to Modification 3 has been described with reference to FIG. 19.

As described above, the MU-CQI and the CL-MU-CQI are notified separately, and therefore, for example, when the CL-MU-CQI is not the preferred setting, the base station 100 can also determine that control is performed so that the DL and the UL are not performed simultaneously between corresponding users.

(Modification 4)

Next, another modification of the communication system according to the embodiment of the present disclosure will be described. Hereinafter, the present modification is also referred to as "Modification 4".

When measuring crosslink interference, as described above, there is a need to obtain the interference signal power by combining UL signal interference (hereinafter, simply referred to as "UL interference") and DL signal interference (hereinafter, simply referred to as "DL interference"). On the other hand, a subframe for measuring UL interference (that is, crosslink interference) may be different from a subframe for measuring DL interference (that is, interference between DL signals provisioned in the conventional protocol). Therefore, if the association between the separately measured interference signals is not specified, it may be difficult for the terminal device 200 to correctly combine interference signal power.

Therefore, in the communication system according to the present modification, information indicating setting related to the DL interference (DL interference configuration) and setting related to the crosslink interference (CL interference configuration) belong to interference measurement setting is notified from the base station 100 to the terminal device 200. For example, a downlink reference signal indicator (DRI), which is identification information unique to a DL reference signal, may be used for notification of the DL interference configuration. Similarly, a URI, which is identification information unique to the DL reference signal, may be used for notification of the CL interference configuration. For example, Table 2 shown below shows an example of interference measurement setting.

TABLE 2

Example of Interference measurement setting

| Interference measurement setting | DL RS configuration (DRI: Downlink Reference signal Indicator) | CL RS configuration (URI: Uplink Reference Signal Indicator) |
|---|---|---|
| 1 | 1, 2, 3 | 4, 5 |
| 2 | 1, 2, 5 | 3 |

Note that a plurality of interference measurement settings may be set for the terminal device 200. In addition, a DL RS configuration and a CL RS configuration can be specified by each Interference measurement setting. As described above, the "CL RS Configuration" corresponds to a configuration of the UL reference signal. On the other hand, the "DL RS configuration" corresponds to the configuration of the DL reference signal. Information on the plurality of interference measurement settings may be set from the base station 100 to the terminal device 200. In the information included in the above-described interference measurement setting, the CL interference configuration corresponds to an example of "second information", whereas the DL interference configuration corresponds to an example of "fourth information".

With the above-described control, the terminal device 200 can recognize the association between the interference signals separately measured, so the interference signal power can be correctly combined.

4. Application Example

A technology according to the present disclosure can be applied to various products. For example, the base station 100 may be realized as any type of evolved NodeB (eNB) such as a macro eNB or a small eNB. The small eNB may be an eNB that covers a cell smaller than a macro cell, such as a pico eNB, a micro eNB, or a home (femto) eNB. Instead, the base station 100 may be realized as other types of base stations such as NodeB or a base transceiver station (BTS). The base station 100 may include a main unit (also referred to as a base station device) that controls wireless communication, and one or more remote radio heads (RRH) that are arranged at different locations from the main unit. In addition, various types of terminals described later may operate as the base station 100 by temporarily or semi-permanently executing the base station function. Furthermore, at least some components of the base station 100 may be realized in a base station device or a module for the base station device.

In addition, for example, the terminal device 200 may be realized as a mobile terminal such as a smartphone, a tablet personal computer (PC), a notebook PC, a portable game terminal, a portable/dongle type mobile router, or a digital camera, or an in-vehicle terminal such as a car navigation device. Further, the terminal device 200 may be realized as a terminal (referred to as a machine type communication (MTC) terminal) that performs machine to machine (M2M) communication. In addition, the terminal device 200 may be realized as a so-called low-cost UE such as an MTC terminal, an eMTC terminal, and an NB-IoT terminal. Further, at least some components of the terminal device 200 may be realized in a module (for example, integrated circuit module constituted by one die) mounted on the terminal.

4.1. Application Example for Base Station

First Application Example

Figure 20:
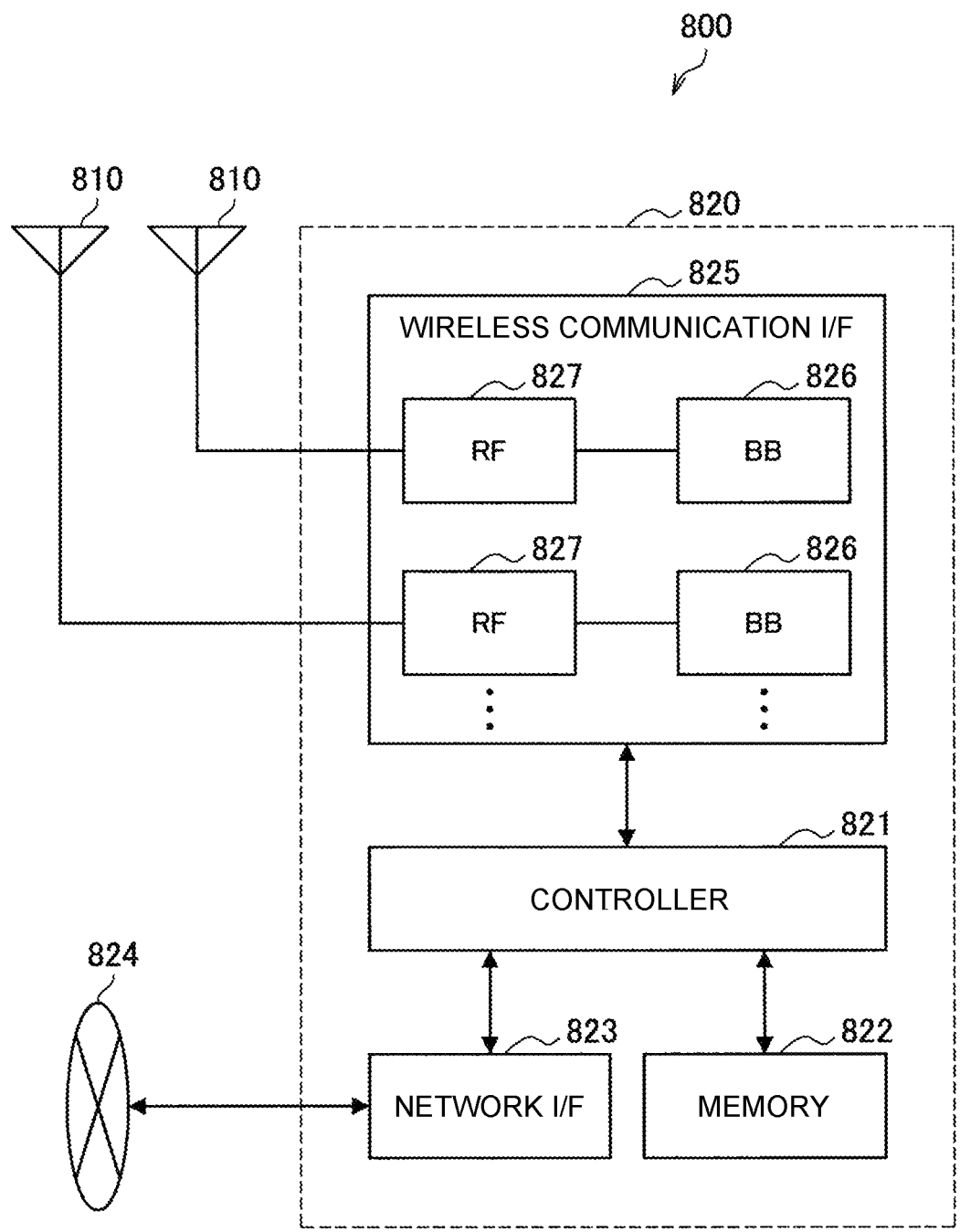
FIG. 20 is a block diagram illustrating a first example of a schematic configuration of an eNB.

FIG. 20 is a block diagram illustrating a first example of a schematic configuration of an eNB to which the technology according to the present disclosure can be applied. An eNB 800 has one or more antennas 810 and a base station device 820. Each antenna 810 and the base station device 820 can be connected to each other via an RF cable.

Each antenna 810 has a single or a plurality of antenna elements (for example, a plurality of antenna elements forming a MIMO antenna), and is used by the base station device 820 to transmit and receive a wireless signal. As illustrated in FIG. 20, the eNB 800 has the plurality of antennas 810, and the plurality of antennas 810 may correspond to each of the plurality of frequency bands used by the eNB 800, for example. Although FIG. 20 illustrates an example in which the eNB 800 has the plurality of antennas 810, the eNB 800 may have the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by a wireless communication interface 825, and transfers the generated packet via the network interface 823. The controller 821 may generate a bundled packet by bundling data from a plurality of baseband processors, and transmit the generated bundled packet. Further, the controller 821 may have logical functions that execute control such as radio resource control, radio bearer control, mobility management, admission control, or scheduling. Further, the control may be executed in cooperation with neighboring eNBs or a core network node. The memory 822 includes a RAM and a ROM, and stores a program executed by the controller 821 and various control data (for example, terminal list, transmission power data, scheduling data, and the like).

The network interface 823 is a communication interface for connecting the base station device 820 to the core network 824. The controller 821 may communicate with a core network node or other eNBs via the network interface 823. In that case, the eNB 800 and the core network node or another eNB may be connected to each other by a logical interface (for example, an S1 interface or an X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports one of cellular communication systems such as long term evolution (LTE) or LTE-Advanced, and provides a wireless connection to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, and multiplexing/demultiplexing, and may execute various signal processing of each layer (for example, L1, medium access control (MAC), radio link control (RLC), and packet data convergence protocol (PDCP)). The BB processor 826 may have some or all of the above logical functions instead of the controller 821. The BB processor 826 may be a module that includes a memory storing a communication control program, a processor executing the program, and related circuits, and the function of the BB processor 826 may be changed by updating the program. Further, the module may be a card or a blade that is inserted into a slot of the base station device 820, or a chip that is mounted on the card or the blade. On the other hand, the RF circuit 827 may include a mixer, a filter, an amplifier, and the like, and transmits and receives a wireless signal via the antenna 810.

As illustrated in FIG. 20, the wireless communication interface 825 includes the plurality of BB processors 826, and the plurality of BB processors 826 may correspond to, for example, each of the plurality of frequency bands used by the eNB 800. Further, the wireless communication interface 825 includes a plurality of RF circuits 827 as illustrated in FIG. 20, and the plurality of RF circuits 827 may correspond to, for example, a plurality of antenna elements, respectively. Although FIG. 20 illustrates an example in which the wireless communication interface 825 includes the plurality of BB processors 826 and the plurality of RF circuits 827, the wireless communication interface 825 includes a single BB processor 826 or a single RF circuit 827.

In the eNB 800 illustrated in FIG. 20, one or more components (at least any one of the communication control unit 151, the information acquisition unit 153, and the notification unit 155) included in the processing unit 150 described with reference to FIG. 2 may be mounted in the wireless communication interface 825. Alternatively, at least some of these components may be implemented in the controller 821. As an example, the eNB 800 includes a module that includes some (for example, BB processor 826) or all of the wireless communication interfaces 825 and/or the controller 821, and the module may include the one or more components. In this case, the module may store a program (in other words, a program for allowing the processor to execute the operations of the one or more components) for allowing the processor to function as the one or more components, and execute the program. As another example, the program for allowing the processor to function as the one or more components is installed in the eNB 800, and the wireless communication interface 825 (for example, BB processor 826) and/or the controller 821 may execute the program. As described above, as a device including the one or more components, the eNB 800, the base station device 820, or the module may be provided, and the program for allowing the processor to function as the one or more components may be provided. Further, a readable recording medium on which the program is recorded may be provided.

In addition, in the eNB 800 illustrated in FIG. 20, the wireless communication unit 120 described with reference to FIG. 2 may be mounted in the wireless communication interface 825 (for example, RF circuit 827). Further, the antenna unit 110 may be mounted in the antenna 810. Further, the network communication unit 130 may be mounted in the controller 821 and/or the network interface 823. Further, the storage unit 140 may be mounted in the memory 822.

Second Application Example

Figure 21:
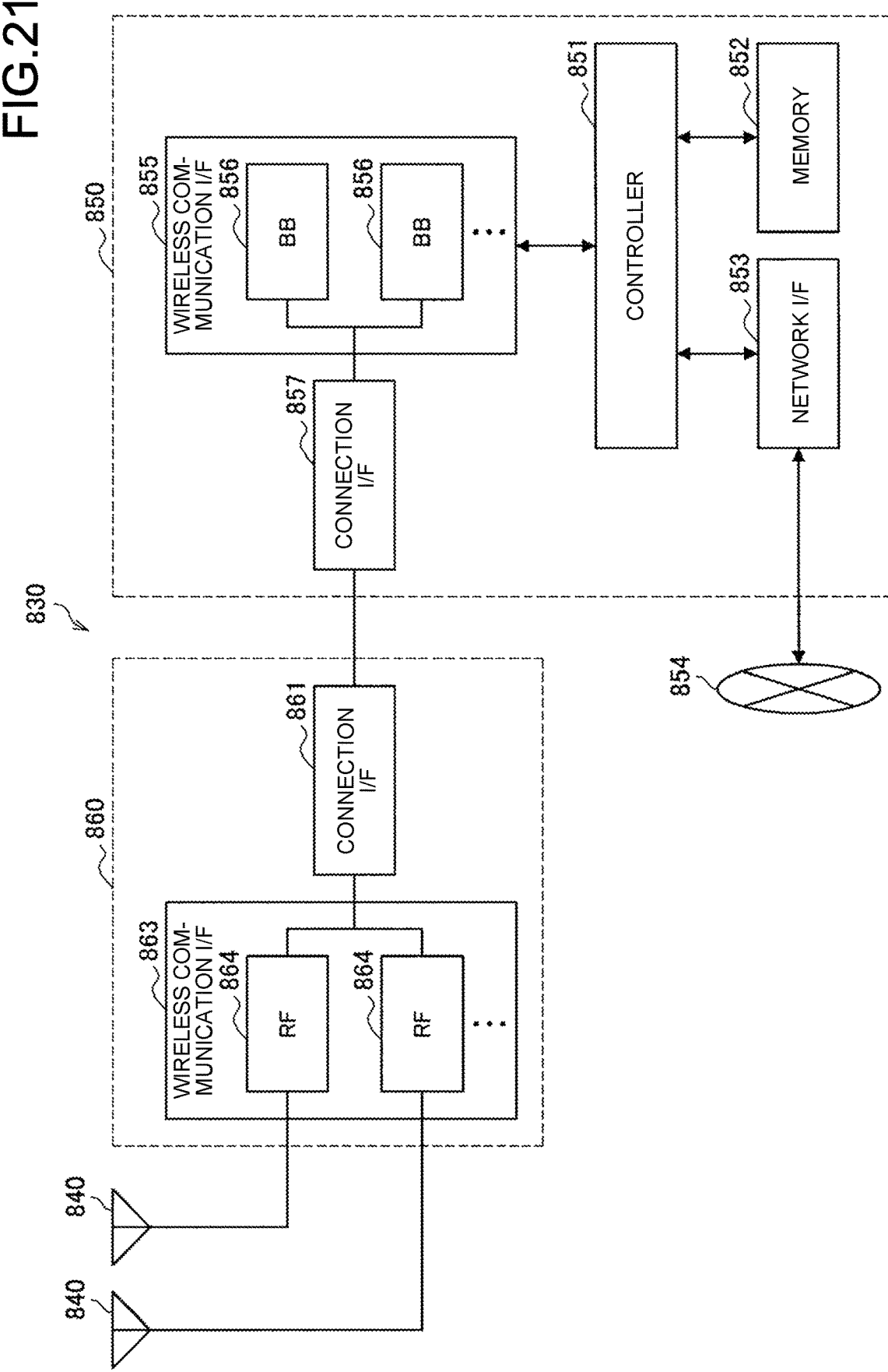
FIG. 21 is a block diagram illustrating a second example of the schematic configuration of the eNB.

FIG. 21 is a block diagram illustrating a second example of a schematic configuration of the eNB to which the technology according to the present disclosure can be applied. An eNB 830 has one or more antennas 840, a base station device 850, and RRH 860. Each antenna 840 and the RRH 860 can be connected to each other via an RF cable. Further, the base station device 850 and the RRH 860 can be connected to each other by a high-speed line such as an optical fiber cable.

Each antenna 840 has a single or a plurality of antenna elements (for example, a plurality of antenna elements forming a MIMO antenna), and is used by the RRH 860 to transmit and receive a wireless signal. As illustrated in FIG. 21, the eNB 830 has the plurality of antennas 840, and the plurality of antennas 840 may correspond to, for example, each of the plurality of frequency bands used by the eNB 830. Although FIG. 21 illustrates an example in which the eNB 830 has the plurality of antennas 840, the eNB 830 may have the single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 20.

The wireless communication interface 855 supports one of cellular communication systems such as long term evolution (LTE) or LTE-Advanced, and provides a wireless connection to a terminal located in a cell corresponding to the RRH 860 via the RRH 860 and the antenna 840. The wireless communication interface 855 may typically include a BB processor 856 and the like. The BB processor 856 is similar to the BB processor 826 described with reference to FIG. 20 except that the BB processor 856 is connected to the RF circuit 864 of the RRH 860 via the connection interface 857. As illustrated in FIG. 20, the wireless communication interface 855 includes the plurality of BB processors 856, and the plurality of BB processors 856 may correspond to each of the plurality of frequency bands used by the eNB 830, for example. Although FIG. 21 illustrates an example in which the wireless communication interface 855 includes the plurality of BB processors 856, the wireless communication interface 855 may include a single BB processor 856.

The connection interface 857 is an interface that connects the base station device 850 (wireless communication interface 855) to the RRH 860. The connection interface 857 may be a communication module for communication on the high-speed line that connects the base station device 850 (wireless communication interface 855) to the RRH 860.

In addition, the RRH 860 includes a connection interface 861 and a wireless communication interface 863.

The connection interface 861 is an interface that connects the RRH 860 (wireless communication interface 863) to the base station device 850. The connection interface 861 may be a communication module for communication on the high-speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal via the antenna 840. The wireless communication interface 863 includes a plurality of RF circuits 864 as illustrated in FIG. 21, and the plurality of RF circuits 864 may correspond to, for example, a plurality of antenna elements, respectively. Although FIG. 21 illustrates an example in which the wireless communication interface 863 includes the plurality of RF circuits 864, the wireless communication interface 863 may include a single RF circuit 864.

In the eNB 830 illustrated in FIG. 21, one or more components (at least any one of the communication control unit 151, the information acquisition unit 153, and the notification unit 155) included in the processing unit 150 described with reference to FIG. 2 may be mounted in the wireless communication interface 855 and/or the wireless communication interface 863. Alternatively, at least some of these components may be mounted in the controller 851. As an example, the eNB 830 includes a module that includes some (for example, BB processor 856) or all of the wireless communication interfaces 855 and/or the controller 851, and the module may include the one or more components. In this case, the module may store a program (in other words, a program for allowing the processor to execute the operations of the one or more components) for allowing the processor to function as the one or more components, and execute the program. As another example, the program for allowing the processor to function as the one or more components is installed in the eNB 830, and the wireless communication interface 855 (for example, BB processor 856) and/or the controller 851 may execute the program. As described above, as a device including the one or more components, the eNB 830, the base station device 850, or the module may be provided, and the program for allowing the processor to function as the one or more components may be provided. Further, a readable recording medium on which the program is recorded may be provided.

In addition, in the eNB 830 illustrated in FIG. 21, for example, the wireless communication unit 120 described with reference to FIG. 2 may be mounted in the wireless communication interface 863 (for example, RF circuit 864). Further, the antenna unit 110 may be mounted in the antenna 840. Further, the network communication unit 130 may be mounted in the controller 851 and/or the network interface 853. Further, the storage unit 140 may be mounted in the memory 852.

4.2. Application Example for Terminal Device

First Application Example

Figure 22:
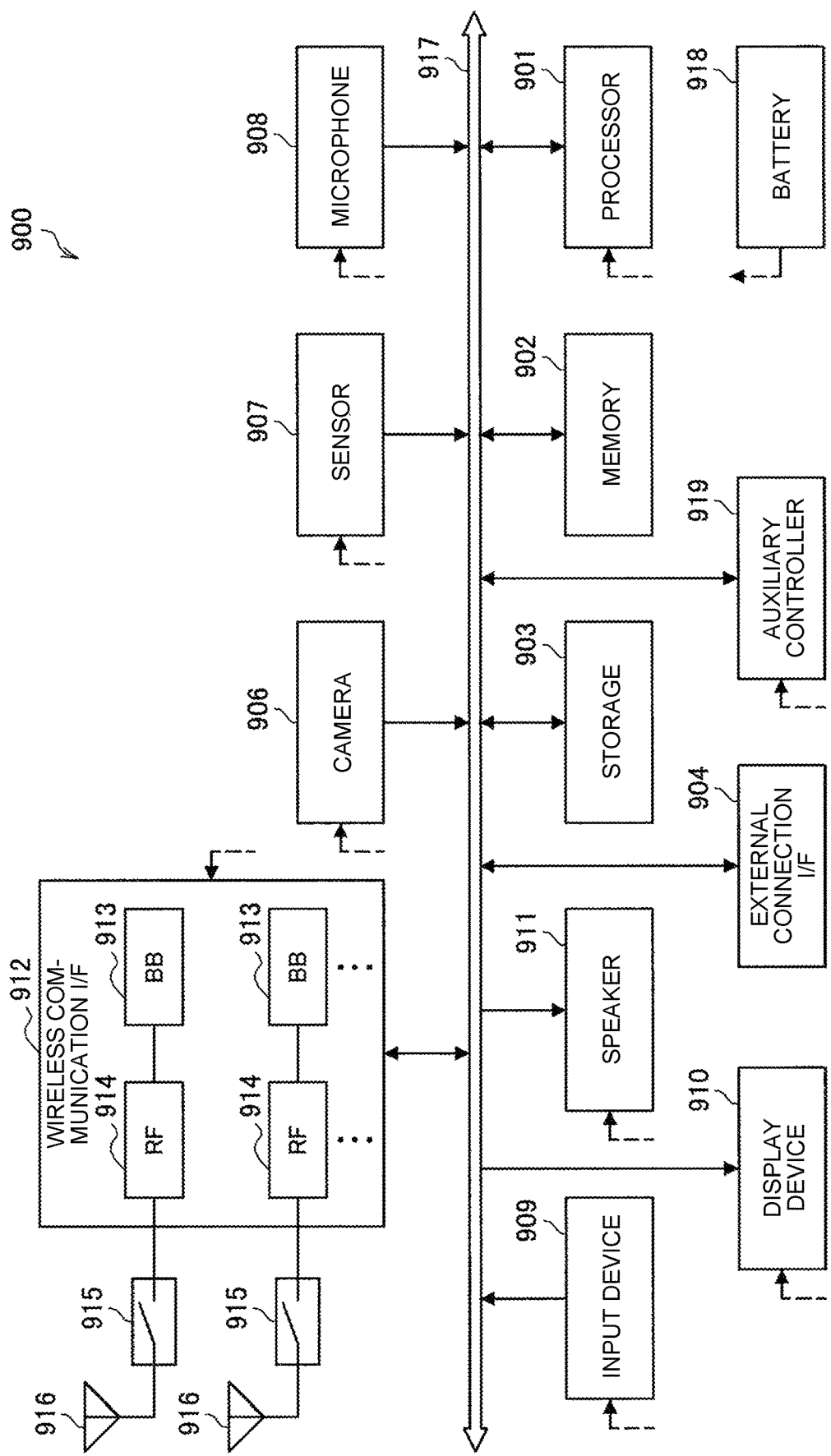
FIG. 22 is a block diagram illustrating an example of a schematic configuration of a smartphone.

FIG. 22 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, and one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores programs and data executed by the processor 901. The storage 903 may include a storage medium such as a semiconductor memory or a hard disk. The external connection interface 904 is an interface that connects an external device such as a memory card or a universal serial bus (USB) device to the smartphone 900.

The camera 906 has an imaging element such as a charge coupled device (CCD) or a complementary metal oxide semiconductor (CMOS), and generates a captured image. The sensor 907 may include a group of sensors such as a positioning sensor, a gyro sensor, a geomagnetic sensor, and an acceleration sensor. The microphone 908 converts audio input to the smartphone 900 into an audio signal. The input device 909 includes, for example, a touch sensor that detects a touch on a screen of the display device 910, a keypad, a keyboard, a button, a switch, or the like and receives an operation or information input from a user. The display device 910 has a screen such as a liquid crystal display (LCD) or an organic light emitting diode (OLED) display, and displays an output image of the smartphone 900. The speaker 911 converts an audio signal output from the smartphone 900 into audio.

The wireless communication interface 912 supports one of cellular communication systems such as LTE and LTE-Advanced, and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and perform various signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include the plurality of BB processors 913 and the plurality of RF circuits 914 as illustrated in FIG. 22. Although FIG. 22 illustrates an example in which the wireless communication interface 912 includes the plurality of BB processors 913 and the plurality of RF circuits 914, the wireless communication interface 912 includes a single BB processor 913 or a single RF circuit 914.

Further, the wireless communication interface 912 may support other types of wireless communication schemes such as a short-range wireless communication scheme, a close-range wireless communication scheme, or a wireless local area network (wireless LAN) scheme, in addition to the cellular communication method, and in this case, may include the BB processor 913 and the RF circuit 914 for each wireless communication system.

Each of the antenna switches 915 switches a connection destination of the antenna 916 among a plurality of circuits (for example, circuits for different wireless communication schemes) included in the wireless communication interface 912.

Each antenna 916 has a single or a plurality of antenna elements (for example, a plurality of antenna elements forming a MIMO antenna), and is used by the wireless communication interface 912 to transmit and receive a wireless signal. The smartphone 900 may have the plurality of antennas 916 as illustrated in FIG. 22. Although FIG. 22 illustrates an example in which the smartphone 900 has the plurality of antennas 916, the smartphone 900 may have the single antenna 916.

Furthermore, the smartphone 900 may include the antenna 916 for each wireless communication scheme. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 22 via a power supply line partially indicated by a broken line in the drawing. The auxiliary controller 919 operates required minimum functions of the smartphone 900 in a sleep mode, for example.

In the smartphone 900 illustrated in FIG. 22, one or more components (at least any one of the communication control unit 241, the information acquisition unit 243, the measurement unit 245, and the notification unit 247) included in the processing unit 240 described with reference to FIG. 3 may be mounted in the wireless communication interface 912. Alternatively, at least some of these components may be mounted in the processor 901 or the auxiliary controller 919. As an example, the smartphone 900 includes a module that includes some (for example, BB processor 913) or all of the wireless communication interfaces 912, a processor 901, and/or the auxiliary controller 919, and the module may include the one or more components. In this case, the module may store a program (in other words, a program for allowing the processor to execute the operations of the one or more components) for allowing the processor to function as the one or more components, and execute the program. As another example, the program for allowing the processor to function as the one or more components is installed in the smartphone 900, and the wireless communication interface 912 (for example, BB processor 913), the processor 901, and/or the auxiliary controller 919 may execute the program. As described above, as a device including the one or more components, the smartphone 900 or the module may be provided, and the program for allowing the processor to function as the one or more components may be provided. Further, a readable recording medium on which the program is recorded may be provided.

In addition, in the smartphone 900 illustrated in FIG. 22, for example, the wireless communication unit 220 described with reference to FIG. 3 may be mounted in the wireless communication interface 912 (for example, RF circuit 914). Further, the antenna unit 210 may be mounted in the antenna 916. Further, the storage unit 230 may be mounted in the memory 902.

Second Application Example

FIG. 23 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM, and stores programs and data executed by the processor 921.

The GPS module 924 measures positions (for example, latitude, longitude, and altitude) of the car navigation device 920 using a GPS signal received from a GPS satellite. The sensor 925 may include a group of sensors such as a gyro sensor, a geomagnetic sensor, and an air pressure sensor. The data interface 926 is connected to the in-vehicle network 941 via a terminal device (not shown), for example, and acquires data generated on a vehicle side such as vehicle speed data.

The content player 927 plays a content stored in a storage medium (for example, CD or DVD) inserted into the storage medium interface 928. The input device 929 includes, for example, a touch sensor that detects a touch on a screen of the display device 930, a button, a switch, or the like and receives an operation or information input from a user. The display device 930 has a screen such as an LCD or an OLED display, and displays a navigation function or an image of a content to be played. The speaker 931 outputs the navigation function or the audio of the content to be played.

The wireless communication interface 933 supports one of cellular communication systems such as LTE and LTE-Advanced, and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and perform various signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include the plurality of BB processors 934 and the plurality of RF circuits 935 as illustrated in FIG. 23. Although FIG. 23 illustrates an example in which the wireless communication interface 933 includes the plurality of BB processors 934 and the plurality of RF circuits 935, the wireless communication interface 933 includes a single BB processor 934 or a single RF circuit 935.

Further, the wireless communication interface 933 may support other types of wireless communication schemes such as a short-range wireless communication scheme, a close-range wireless communication scheme, or a wireless LAN scheme, in addition to the cellular communication method, and in this case, may include the BB processor 934 and the RF circuit 935 for each wireless communication system.

Each of the antenna switches 936 switches a connection destination of the antenna 937 among a plurality of circuits (for example, circuits for different wireless communication schemes) included in the wireless communication interface 933.

Each antenna 937 has a single or a plurality of antenna elements (for example, a plurality of antenna elements forming a MIMO antenna), and is used by the wireless communication interface 933 to transmit and receive a wireless signal. The car navigation device 920 may have the plurality of antennas 937 as illustrated in FIG. 23. Although FIG. 23 illustrates an example in which the car navigation device 920 has the plurality of antennas 937, the car navigation device 920 may have the single antenna 937.

Furthermore, the car navigation device 920 may include the antenna 937 for each wireless communication scheme. In that case, the antenna switch 936 may be omitted from the configuration of the car navigation device 920.

The battery 938 supplies power to each block of the car navigation device 920 illustrated in FIG. 23 via a power supply line partially indicated by a broken line in the drawing. In addition, the battery 938 stores power supplied from the vehicle side.

In the car navigation device 920 illustrated in FIG. 23, one or more components (at least any one of the communication control unit 241, the information acquisition unit 243, the measurement unit 245, and the notification unit 247) included in the processing unit 240 described with reference to FIG. 3 may be mounted in the wireless communication interface 933. Alternatively, at least some of these components may be mounted in the processor 921. As an example, the car navigation device 920 includes a module that includes some (for example, BB processor 934) or all of the wireless communication interfaces 933 and/or the processor 921, and the module may include the one or more components. In this case, the module may store a program (in other words, a program for allowing the processor to execute the operations of the one or more components) for allowing the processor to function as the one or more components, and execute the program. As another example, the program for allowing the processor to function as the one or more components is installed in the car navigation device 920, and the wireless communication interface 933 (for example, BB processor 934) and/or the processor 921 may execute the program. As described above, as a device including the one or more components, the car navigation device 920 or the module may be provided, and the program for allowing the processor to function as the one or more components may be provided. Further, a readable recording medium on which the program is recorded may be provided.

In addition, in the car navigation device 920 illustrated in FIG. 23, for example, the wireless communication unit 220 described with reference to FIG. 3 may be mounted in the wireless communication interface 933 (for example, RF circuit 935). Further, the antenna unit 210 may be mounted in the antenna 937. Further, the storage unit 230 may be mounted in the memory 922.

Further, the technology according to the present disclosure may be implemented as an in-vehicle system (or vehicle) 940 that includes one or more blocks of the above-described car navigation device 920, an in-vehicle network 941, and a vehicle-side module 942. That is, the in-vehicle system (or vehicle) 940 may be provided as a device including at least one of the communication control unit 241, the information acquisition unit 243, the measurement unit 245, and the notification unit 247. The vehicle-side module 942 generates vehicle-side data such as vehicle speed, engine speed, or failure information, and outputs the generated data to the in-vehicle network 941.

5. Conclusion

As described above, in the system according to the present embodiment, the base station 100-1 that causes the terminal device 200-1 to measure the crosslink interference acquires, from another base station 100-2, the first information related to the terminal device 200-2 located within the communication range of another base station 100-2. Based on the acquired first information, the base station 100-1 notifies the terminal device 200-1 of the second information for measuring the interference (that is, crosslink interference) of the UL signal transmitted from the terminal device 200-2 to another base station 100-2 with the DL signal transmitted to the terminal device 200-1.

With such a configuration, the terminal device 200-1 can efficiently measure the interference (that is, crosslink interference) between the DL signal and the UL signal transmitted in different cells.

In addition, the terminal device 200-1 acquires the second information on the other terminal device 200-2 from the base station 100-1. The terminal device 200-1 notifies the base station 100-1 of the third information on the interference (that is, crosslink interference) of the uplink signal transmitted from the other terminal device 200-2 to the other base station 100-2 with the DL signal transmitted from the base station 100-1, in which the interference is measured based on the second information.

With this configuration, the base station 100-1 can set the more appropriate modulation scheme and coding rate for the communication with the terminal device 200-1 in consideration of the influence of the crosslink interference. Therefore, according to the communication system according to the present embodiment, the effect of further improving the throughput of the entire system can be expected.

Hereinabove, the preferred embodiments of the present disclosure have been described in detail with reference to the accompanying drawings, but the technical scope of the present disclosure is not limited to such examples. It will be apparent to those skilled in the art of the present disclosure that various changes or modifications can be conceived within the scope of the technical idea described in the claims, and it is naturally understood that these changes or modifications fall within the technical scope of the present disclosure.

In addition, the effects described in the present specification are merely illustrative or exemplary, and are not limited to those described in the present specification. That is, the technology according to the present disclosure can exhibit other effects apparent to those skilled in the art from the description of the present specification, in addition to or instead of the effects described above.

The following configurations are also within the technical scope of the present disclosure.

(1)

A communication device, comprising:

a communication unit that performs wireless communication with a first terminal device located within a communication range;

an acquisition unit that acquires, from another base station, first information related to a second terminal device located within a communication range of the other base station; and a notification unit that notifies the first terminal device of second information for measuring interference of an uplink signal transmitted from the second terminal device to the other base station with a downlink signal transmitted to the first terminal device, based on the acquired first information.

(2)
The communication device according to (1), wherein the second information includes information on setting for the second terminal device to transmit a reference signal used for measuring the interference to the other base station.
(3)
The communication device according to (2), wherein common setting for the second terminal device to transmit the reference signal to the other base station is performed on the plurality of second terminal devices, and
the second information includes information on the common setting.
(4)
The communication device according to (3), wherein common first identification information on a communication sequence for transmitting the reference signal is set for the plurality of second terminal devices, and
the information on the common setting includes the first identification information.
(5)
The communication device according to (3) or (4), wherein the information on the common setting includes at least one of information on a time resource for transmitting the reference signal, information on a frequency resource, and information on frequency hopping.
(6)
The communication device according to (2), further comprising: a control unit that allocates a resource for the first terminal device to measure the interference, wherein the second information includes information on the resource.
(7)
The communication device according to (6), wherein common setting for the second terminal device to transmit the reference signal to the other base station is performed on the plurality of second terminal devices,
the control unit allocates the resource common to the plurality of second terminal devices for measuring the interference due to uplink signals from the plurality of second terminal devices, and
the second information includes information on the resource common to the plurality of second terminal devices.
(8)
The communication device according to any one of (1) to (7), wherein the notification unit notifies the first terminal device of a condition on notification of third information according to a measurement result of the interference, and
the acquisition unit acquires the third information from the first terminal device after the second information is notified to the first terminal device.
(9)
The communication device according to (8), wherein the condition includes at least one of a condition on power of the uplink signal and a condition according to a power difference between the downlink signal and the uplink signal.
(10)
The communication device according to any one of (1) to (9), wherein the notification unit notifies the first terminal device of the second information and fourth information for measuring interference between downlink signals transmitted to each of the plurality of terminal devices.
(11)
The communication device according to any one of (1) to (10), wherein the wireless communication is wireless communication that switches between uplink and downlink in a time division manner.
(12)
A communication device, comprising:
a communication unit that performs wireless communication with a first base station;
an acquisition unit that acquires, from the first base station, second information on another terminal device located within a communication range of a second base station different from the first base station; and
a notification unit that notifies the first base station of third information on interference of an uplink signal transmitted from the other terminal device to the second base station with a downlink signal transmitted from the first base station, the interference being measured based on the second information.
(13)
The communication device according to (12), wherein the interference is measured based on a reference signal transmitted from the other terminal device,
the second information includes information on a setting for the other terminal device to transmit the reference signal to the second base station, and
the notification unit associates second identification information corresponding to the reference signal with the third information and notifies the first base station of the third information.
(14)
The communication device according to (12), wherein the interference is measured based on a reference signal transmitted from the other terminal device,
the second information includes information on a setting for the other terminal device to transmit the reference signal to the second base station, and
the notification unit associates second identification information corresponding to the reference signal from the terminal device excluded from the notification of the third information with the third information when notifying the third information according to the measurement result of the interference based on the reference signal transmitted from some of the plurality of other terminal devices.
(15)
The communication device according to any one of (12) to (14), wherein the third information includes information corresponding to a first indicator related to channel quality assuming the interference.
(16)
The communication device according to (15), wherein the notification unit notifies the first base station of information corresponding to the first indicator and information corresponding to a second indicator related to the channel quality assuming interference between downlink signals transmitted to each of the plurality of terminal devices.
(17)
The communication device according to (16), wherein the third information includes information corresponding to the first indicator and information corresponding to the second indicator.
(18)
The communication device according to (16), wherein the notification unit individually notifies the first base station of the third information including information corresponding to the first indicator and information corresponding to the second indicator.
(19)
A communication method allowing a computer to execute the following steps:
performing wireless communication with a first terminal device located within a communication range;

acquiring, from another base station, first information related to a second terminal device located within a communication range of the other base station; and notifying the first terminal device of second information for measuring interference of an uplink signal transmitted from the second terminal device to the other base station with a downlink signal transmitted to the first terminal device, based on the acquired first information.

(20)

A communication method allowing a computer to execute the following steps:

performing wireless communication with a first base station;

acquiring, from the first base station, second information on another terminal device located within a communication range of a second base station different from the first base station; and notifying the first base station of third information on interference of an uplink signal transmitted from the other terminal device to the second base station with a downlink signal transmitted from the first base station, the interference being measured based on the second information.

(21)

A program allowing a computer to execute the following operations:

performing wireless communication with a first terminal device located within a communication range;

acquiring, from another base station, first information related to a second terminal device located within a communication range of the other base station; and notifying the first terminal device of second information for measuring interference of an uplink signal transmitted from the second terminal device to the other base station with a downlink signal transmitted to the first terminal device, based on the acquired first information.

(22)

A program allowing a computer to execute the following operations:

performing wireless communication with a first base station;

acquiring, from the first base station, second information on another terminal device located within a communication range of a second base station different from the first base station; and notifying the first base station of third information on interference of an uplink signal transmitted from the other terminal device to the second base station with a downlink signal transmitted from the first base station, the interference being measured based on the second information.

REFERENCE SIGNS LIST

1 SYSTEM
10 CELL
100 BASE STATION
110 ANTENNA UNIT
120 WIRELESS COMMUNICATION UNIT
130 NETWORK COMMUNICATION UNIT
140 STORAGE UNIT
150 PROCESSING UNIT
151 COMMUNICATION CONTROL UNIT
153 INFORMATION ACQUISITION UNIT
155 NOTIFICATION UNIT
200 TERMINAL DEVICE
210 ANTENNA UNIT
220 WIRELESS COMMUNICATION UNIT
230 STORAGE UNIT
240 PROCESSING UNIT
241 COMMUNICATION CONTROL UNIT
243 INFORMATION ACQUISITION UNIT
245 MEASUREMENT UNIT
247 NOTIFICATION UNIT

The invention claimed is:

1. A communication device configured to operate as a first base station, comprising:
    communication circuitry that performs wireless communication with a first terminal device located within a communication range of the first base station; and
    processing circuitry that:
        transmits a beamformed synchronization signal to the first terminal device by beam sweeping,
        performs beamsweeping for beam measurement to determine a directional beam between the first base station and the first terminal device,
        performs a process for channel state information (CSI) acquisition for measuring a channel quality of the directional beam and determines a modulation scheme (MCS) and a coding rate for the directional beam based on the acquired CSI, and
        transmits user data to the first terminal device via the directional beam in accordance with the MCS and the coding rate,
    wherein the process for CSI acquisition comprises:
        acquiring, from another base station, first information related to a second terminal device located within a communication range of the other base station;
        notifying the first terminal device of second information for measuring crosslink interference between an uplink reference signal transmitted from the second terminal device via an interfering directional beam to the other base station and downlink signal transmitted to the first terminal device via the directional beam from the first base station, based on the acquired first information,
    wherein the first information includes information regarding the uplink reference signal,
    wherein the second information includes the first information and a crosslink interference resource to be used by the first terminal device to measure the crosslink interference; and
    receiving a crosslink interference report from the first terminal device based on a crosslink interference measured by the first terminal device in accordance with the second information,
    wherein the crosslink interference measured by the first terminal device comprises an interference between:
        the uplink reference signal transmitted from the second terminal device via the interfering directional beam to the other base station in accordance with the first information, and
        the downlink signal transmitted to the first terminal device via the directional beam from the first base station.

2. The communication device according to claim 1, wherein the second information includes a device-specific sequence identifier (ID) used by the first terminal device to detect the uplink reference signal transmitted by the second terminal device.

3. The communication device according to claim 1, wherein the second terminal device is one of a plurality of second terminal devices, each of the plurality of second terminal devices transmitting a terminal-specific uplink reference signal via a terminal-specific interfering directional beam to the other base station, and wherein the second information further includes:
first identification information that includes a device-specific sequence identifier (ID) for each plurality of second terminal devices to enable the first terminal device to discriminate between uplink references signals of each of the plurality of second terminal devices that are causing the crosslink interference; and
second identification information that includes an uplink reference signal identifier (URI) identifying each of the plurality of second terminal devices such that the crosslink interference report provides terminal specific interference information to the first base station.

4. The communication device according to claim 3, wherein the second information further includes at least one of information uniquely used by each of the plurality of second terminal devices, to include information on a time resource for transmitting the uplink reference signal, information on a frequency resource for transmitting the uplink reference signal, or information on frequency hopping for transmitting the uplink reference signal.

5. The communication device according to claim 3, wherein the second information further includes an interference reporting threshold such that the terminal specific interference information only includes interference information for those of the plurality of second terminal devices causing a crosslink interference that is above the interference reporting threshold.

6. The communication device according to claim 1,
wherein the crosslink interference measured by the first terminal device comprises crosslink multi-user channel quality information (CL-MU-CQI), and
wherein the crosslink interference report further includes multi-user channel quality information (MU-CQI) regarding interference between a downlink reference signal transmitted from the second terminal device and the downlink signal transmitted to the first terminal device via the directional beam from the first base station.

7. The communication device according to claim 1, wherein the wireless communication is wireless communication that switches between uplink and downlink in a time division manner.

8. A communication device configured to operate as a first terminal device, comprising:
communication circuitry that performs wireless communication with a first base station; and
processing circuitry that:
receives a beamformed synchronization signal from the first base station via beam sweeping,
receives beamsweeping for beam measurement from the first base station to enable the first base station to determine a directional beam between the first base station and the first terminal device,
performs a process for channel state information (CSI) acquisition for measuring a channel quality of the directional beam and determines a modulation scheme (MCS) and a coding rate for the directional beam based on the acquired CSI, and
receives user data from the first base station via the directional beam in accordance with the MCS and the coding rate,
wherein the process for CSI acquisition comprises:
acquiring, from the first base station, second information for measuring crosslink interference between an uplink reference signal transmitted from another terminal device located via a first directional beam to a second base station, different from the first base station, and a downlink signal received from the first base station via a second directional beam,
wherein the second information includes first information regarding the uplink reference signal and a crosslink interference resource to be used by the first terminal device to measure the crosslink interference;
interference measurement circuitry that measures the crosslink interference in accordance with the second information; and
providing a crosslink interference report to the first base station,
wherein the crosslink interference measured by the first terminal device comprises an interference between:
the uplink reference signal transmitted from the second terminal device via the first directional beam to the second base station in accordance with the first information, and
the downlink signal transmitted by the first base station via the second directional beam to the first terminal device.

9. The communication device according to claim 8, wherein the second information includes a device-specific sequence identifier (ID) used by the first terminal device to detect the uplink reference signal transmitted by the second terminal device.

10. The communication device according to claim 8,
wherein the second terminal device is one of a plurality of second terminal devices, each of the plurality of second terminal devices transmitting a terminal-specific uplink reference signal via a terminal-specific first directional beam to the other base station, and
wherein the second information further includes:
first identification information that includes a device-specific sequence identifier (ID) for each plurality of second terminal devices to enable the first terminal device to discriminate between uplink references signals of each of the plurality of second terminal devices that are causing the crosslink interference; and
second identification information that includes an uplink reference signal identifier (URI) identifying each of the plurality of second terminal devices such that the crosslink interference report provides terminal specific interference information to the first terminal device.

11. The communication device according to claim 10, wherein the second information further includes at least one of information uniquely used by each of the plurality of second terminal devices, to include information on a time resource for transmitting the uplink reference signal, information on a frequency resource for transmitting the uplink reference signal, or information on frequency hopping for transmitting the uplink reference signal.

12. The communication device according to claim 10, wherein the second information further includes an interference reporting threshold such that the terminal specific interference information only includes interference information for those of the plurality of second terminal devices causing a crosslink interference that is above the interference reporting threshold.

13. The communication device according to claim 8,
wherein the crosslink interference measured by the first terminal device comprises crosslink multi-user channel quality information (CL-MU-CQI), and
wherein the crosslink interference report further includes multi-user channel quality information (MU-CQI) regarding interference between a downlink reference signal transmitted from the second terminal device and the downlink signal transmitted to the first terminal device via the second directional beam from the first terminal device.

14. A communication method performed by a communication device configured to operate as a first base station and that includes a processor and transceiver, the method comprising:
performing wireless communication with a first terminal device located within a communication range of the first base station, wherein the wireless communication comprises:
transmitting a beamformed synchronization signal to the first terminal device by beam sweeping,
performing beamsweeping for beam measurement to determine a directional beam between the first base station and the first terminal device,
performing a process for channel state information (CSI) acquisition for measuring a channel quality of the directional beam and determines a modulation scheme (MCS) and a coding rate for the directional beam based on the acquired CSI, and
transmitting user data to the first terminal device via the directional beam in accordance with the MCS and the coding rate,
wherein the process for CSI acquisition comprises:
acquiring, from another base station, first information related to a second terminal device located within a communication range of the other base station:
notifying the first terminal device of second information for measuring crosslink interference between an uplink reference signal transmitted from the second terminal device via an interfering directional beam to the other base station and a downlink signal transmitted to the first terminal device via the directional beam from the first base station, based on the acquired first information,
wherein the first information includes information regarding the uplink reference signal,
wherein the second information includes the first information and a crosslink interference resource to be used by the first terminal device to measure the crosslink interference; and
receiving a crosslink interference report from the first terminal device based on a crosslink interference measured by the first terminal device in accordance with the second information,
wherein the crosslink interference measured by the first terminal device comprises an interference between:
the uplink reference signal transmitted from the second terminal device via the interfering directional beam to the other base station in accordance with the first information, and
the downlink signal transmitted to the first terminal device via the directional beam from the first base station.

15. A communication method performed by a communication device configured to operate as a first terminal device and that includes a processor and transceiver, the method comprising:
performing wireless communication with a first base station, wherein the wireless communication comprises:
receiving a beamformed synchronization signal from the first base station via beam sweeping,
receiving beamsweeping for beam measurement from the first base station to enable the first base station to determine a directional beam between the first base station and the first terminal device,
performing a process for channel state information (CSI) acquisition for measuring a channel quality of the directional beam and determines a modulation scheme (MCS) and a coding rate for the directional beam based on the acquired CSI, and
receiving user data from the first base station via the directional beam in accordance with the MCS and the coding rate,
wherein the process for CSI acquisition comprises:
acquiring, from the first base station, second information for measuring crosslink interference between an uplink reference signal transmitted from another terminal device located via a first directional beam to a second base station, different from the first base station, and a downlink signal received from the first base station via a second directional beam,
wherein the second information includes first information regarding the uplink reference signal and a crosslink interference resource to be used by the first terminal device to measure the crosslink interference;
interference measurement circuitry that measures the crosslink interference in accordance with the second information; and
providing a crosslink interference report to the first base station,
wherein the crosslink interference measured by the first terminal device comprises an interference between:
the uplink reference signal transmitted from the second terminal device via the first directional beam to the second base station in accordance with the first information, and
the downlink signal transmitted by the first base station via the second directional beam to the first terminal device.

16. A non-transitory, computer readable product containing a program allowing a computer to operate as a communication device for a first base station and to execute the following operations:
performing wireless communication with a first terminal device located within a communication range of the first base station, wherein the wireless communication comprises:
transmitting a beamformed synchronization signal to the first terminal device by beam sweeping,
performing beamsweeping for beam measurement to determine a directional beam between the first base station and the first terminal device,
performing a process for channel state information (CSI) acquisition for measuring a channel quality of the directional beam and determines a modulation scheme (MCS) and a coding rate for the directional beam based on the acquired CSI, and
transmitting user data to the first terminal device via the directional beam in accordance with the MCS and the coding rate,
wherein the process for CSI acquisition comprises:
acquiring, from another base station, first information related to a second terminal device located within a communication range of the other base station;
notifying the first terminal device of second information for measuring crosslink interference between an uplink reference signal transmitted from the second terminal device via an interfering directional beam to the other base station and a downlink signal transmitted to the first terminal device via the directional beam from the first base station, based on the acquired first information, wherein the first information includes information regarding the uplink reference signal, wherein the second information includes the first information and a crosslink interference resource to be used by the first terminal device to measure the crosslink interference; and receiving a crosslink interference report from the first terminal device based on a crosslink interference measured by the first terminal device in accordance with the second information, wherein the crosslink interference measured by the first terminal device comprises an interference between:

the uplink reference signal transmitted from the second terminal device via the interfering directional beam to the other base station in accordance with the first information, and the downlink signal transmitted to the first terminal device via the directional beam from the first base station.

17. A non-transitory computer readable product containing a program allowing a computer to operate as a first terminal device and to execute the following operations:

performing wireless communication with a first base station, wherein the wireless communication comprises:

receiving a beamformed synchronization signal from the first base station via beam sweeping, receiving beamsweeping for beam measurement from the first base station to enable the first base station to determine a directional beam between the first base station and the first terminal device, performing a process for channel state information (CSI) acquisition for measuring a channel quality of the directional beam and determines a modulation scheme (MCS) and a coding rate for the directional beam based on the acquired CSI, and receiving user data from the first base station via the directional beam in accordance with the MCS and the coding rate, wherein the process for CSI acquisition comprises:

acquiring, from the first base station, second information for measuring crosslink interference between an uplink reference signal transmitted from another terminal device located via a first directional beam to a second base station, different from the first base station, and a downlink signal received from the first base station via a second directional beam, wherein the second information includes first information regarding the uplink reference signal and a crosslink interference resource to be used by the first terminal device to measure the crosslink interference;

interference measurement circuitry that measures the crosslink interference in accordance with the second information; and providing a crosslink interference report to the first base station, wherein the crosslink interference measured by the first terminal device comprises an interference between:

the uplink reference signal transmitted from the second terminal device via the first directional beam to the second base station in accordance with the first information, and the downlink signal transmitted by the first base station via the second directional beam to the first terminal device.

* * * * *